US011025909B2

(12) United States Patent
Zhao et al.

(10) Patent No.: US 11,025,909 B2
(45) Date of Patent: Jun. 1, 2021

(54) METHOD AND APPARATUS FOR VIDEO CODING

(71) Applicant: Tencent America LLC, Palo Alto, CA (US)

(72) Inventors: Xin Zhao, San Diego, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/824,492

(22) Filed: Mar. 19, 2020

(65) Prior Publication Data
US 2020/0304782 A1 Sep. 24, 2020

Related U.S. Application Data

(60) Provisional application No. 62/910,127, filed on Oct. 3, 2019, provisional application No. 62/821,657, filed on Mar. 21, 2019.

(51) Int. Cl.
*H04N 19/00* (2014.01)
*H04N 19/11* (2014.01)
*H04N 19/184* (2014.01)
*H04N 19/593* (2014.01)

(52) U.S. Cl.
CPC ........... *H04N 19/11* (2014.11); *H04N 19/184* (2014.11); *H04N 19/593* (2014.11)

(58) Field of Classification Search
CPC ..... H04N 19/11; H04N 19/184; H04N 19/593
See application file for complete search history.

(56) References Cited

U.S. PATENT DOCUMENTS

| 2017/0094314 A1* | 3/2017 | Zhao | H04N 19/122 |
| 2017/0332084 A1* | 11/2017 | Seregin | H04N 19/159 |
| 2018/0131964 A1* | 5/2018 | Min | H04N 19/182 |
| 2018/0332284 A1* | 11/2018 | Liu | H04N 19/139 |
| 2020/0252608 A1* | 8/2020 | Ramasubramonian | H04N 19/176 |

FOREIGN PATENT DOCUMENTS

| WO | WO2017/058615 A1 | 4/2017 |
| WO | WO2017/196957 A1 | 11/2017 |

OTHER PUBLICATIONS

WO Search Report and Written Opinion Issued in Application PCT/US2020/023801 dated Jun. 16, 2020, (17pages).

* cited by examiner

*Primary Examiner* — Zhihan Zhou
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. For example, the processing circuitry receives a bitstream including bits corresponding to residues of a block in a coded picture and parses the bitstream to extract at least one bit that is indicative of a potential usage of an angular prediction of the block. Further, the processing circuitry determines context for coding information of a secondary transform based on the at least one bit that is indicative of the potential usage of the angular prediction of the block, and decode the bits corresponding to the residues of the block using the secondary transform information that is decoded based on the context.

16 Claims, 51 Drawing Sheets

4x4 transform

8x8 transform

16x16 transform

Transform basis functions of DCT-2, DST-7 and DCT-8 for N-point input

| Transform Type | Basis function $T_i(j)$, $i,j=0, 1,\ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

*FIG. 12*

| mts_idx | Transform Type Horizontal | Transform type Vertical |
|---|---|---|
| −1 | 0 | 0 |
| 0 | 1 | 1 |
| 1 | 2 | 1 |
| 2 | 1 | 2 |
| 3 | 2 | 2 |

Transform Type
0 – DCT2
1 – DST7
2 – DCT8

FIG. 13

4-point DST-7:

$$\begin{Bmatrix} a, & b, & c, & d \\ c, & c, & 0, & -c \\ d, & -a, & -c, & b \\ b, & -d, & c, & -a \end{Bmatrix}$$

where $\{a, b, c, d\} = \{29, 55, 74, 84\}$

FIG. 14

8-point DST-7:

{ a, b, c, d, e, f, g, h, }
{ c, f, h, e, b, -a, -d, -g, }
{ e, g, b, -c, -h, -d, a, f, }
{ g, c, -d, -f, a, h, b, -e, }
{ h, -a, -g, b, f, -c, -e, d, }
{ f, -e, -a, g, -d, -b, h, -c, }
{ d, -h, e, a, -f, g, -c, -b, }
{ b, -d, f, -h, g, -e, c, -a, } where {a, b, c, d, e, f, g, h} = { 17, 32, 46, 60, 71, 78, 85, 86}

*FIG. 15*

16-point DST-7:

{ a,  b,  c,  d,  e,  f,  g,  h,  i,  j,  k,  l,  m,  n,  o,  p,}
{ c,  f,  i,  l,  o, -p, -m, -j, -g, -d, -a, -b, -e, -h, -k, -n,}
{ e,  j,  o, -m, -h, -c, -b, -g, -l, -p, -k, -f, -a, -d, -i, -n, (should be verify) } where {a, b, c, d, e, f, g, h, i, j, k, l, m, n, o, p} = {9, 17, 25, 33, 41, 49, 56, 62, 66, 72, 77, 81, 83, 87, 89, 90}

FIG. 16

32-point DST-7 where {a, b, c, d, e, f, g, h, i, j, k, l, m, n, o, p, q, r, s, t, u, v, w, x, y, z, A, B, C, D, E, F} = { 4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90 }

FIG. 17

4-point DCT-8:

{ { a, b, c, d, },
{ b, 0, -b, -d, },
{ c, -b, -b, a, },
{ d, -d, a, -c, } } where {a, b, c, d} = {84, 74, 55, 29}

FIG. 18

8-point DCT-8:

$$\begin{bmatrix} a, & b, & c, & d, & e, & f, & g, & h, \\ b, & e, & h, & -g, & -d, & -a, & -c, & -f, \\ c, & h, & -e, & -a, & -f, & g, & b, & d, \\ d, & -g, & -a, & -h, & c, & e, & -b, & -f, \\ e, & -d, & -f, & c, & g, & -b, & -h, & a, \\ f, & -a, & g, & e, & -b, & h, & d, & -c, \\ g, & -c, & b, & -f, & -h, & d, & -a, & e, \\ h, & -f, & d, & -b, & a, & -c, & e, & -g, \end{bmatrix}$$

where $\{a, b, c, d, e, f, g, h\} = \{86, 85, 78, 71, 60, 46, 32, 17\}$

FIG. 19

16-point DCT-8:

$$\begin{Bmatrix}
\{ a, & b, & c, & d, & e, & f, & g, & h, & i, & j, & k, & l, & m, & n, & o, & p, \} \\
\{ b, & e, & h, & k, & n, & o, & -p, & -l, & -j, & -g, & -d, & -a, & -c, & -f, & -i, & -l, \} \\
\{ c, & h, & m, & -p, & -k, & -f, & -a, & -e, & -j, & -o, & n, & i, & d, & b, & g, & l, \} \\
\{ d, & k, & -p, & -i, & -b, & -f, & -m, & n, & g, & a, & h, & o, & -l, & -e, & -c, & -j, \} \\
\{ e, & n, & -k, & -b, & -h, & o, & j, & a, & k, & -p, & -i, & -c, & -d, & -m, & p, & h, \} \\
\{ f, & o, & -f, & -f, & o, & f, & f, & -o, & -f, & f, & o, & -f, & -f, & o, & f, & f, \} \\
\{ g, & -p, & -a, & -m, & j, & f, & k, & -l, & -e, & -h, & o, & b, & n, & -i, & -c, & -d, \} \\
\{ h, & -l, & -e, & n, & b, & -o, & -a, & -k, & i, & g, & -m, & -c, & p, & d, & -j, & -f, \} \\
\{ i, & -j, & -h, & g, & k, & -f, & -l, & e, & m, & -d, & -n, & c, & o, & -b, & -p, & a, \} \\
\{ j, & -g, & -m, & d, & p, & -a, & -o, & -b, & -l, & e, & i, & -h, & -k, & f, & n, & -c, \} \\
\{ k, & -d, & n, & h, & -i, & -e, & -p, & -c, & m, & -l, & -a, & -j, & f, & o, & b, & -l, \} \\
\{ l, & -a, & i, & o, & -c, & f, & b, & -p, & -h, & -e, & j, & n, & -d, & g, & c, & -m, \} \\
\{ m, & -c, & d, & -l, & -n, & b, & -e, & k, & o, & -a, & f, & -j, & -p, & -g, & -g, & i, \} \\
\{ n, & -f, & b, & -e, & m, & o, & -i, & g, & -d, & h, & -p, & -h, & j, & -b, & c, & -o, \} \\
\{ o, & -i, & g, & -c, & a, & -h, & b, & -j, & p, & -n, & h, & -f, & d, & -a, & e, & -m, \} \\
\{ p, & -l, & l, & -h, & d, & -b, & f, & -j, & n, & -o, & k, & -g, & c, & -a, & e, & -i, \} \\
\end{Bmatrix}$$

where $\{a, b, c, d, e, f, g, h, i, j, k, l, m, n, o, p\} = \{90, 89, 87, 83, 81, 77, 72, 66, 62, 56, 49, 41, 33, 25, 17, 9\}$

| | Descriptor |
|---|---|
| transform_unit( x0, y0, tbWidth, tbHeight, treeType ) { | |
|   if( treeType == SINGLE_TREE \|\| treeType == DUAL_TREE_LUMA ) | |
|     tu_cbf_luma[ x0 ][ y0 ] | ae(v) |
|   if( treeType == SINGLE_TREE \|\| treeType == DUAL_TREE_CHROMA ) { | |
|     tu_cbf_cb[ x0 ][ y0 ] | ae(v) |
|     tu_cbf_cr[ x0 ][ y0 ] | ae(v) |
|   *if(* <br>     *( ( CuPredMode[ x0 ][ y0 ] == MODE_INTRA ) && sps_mts_intra_enabled_flag ) \|\|* <br>     *( ( CuPredMode[ x0 ][ y0 ] == MODE_INTER ) && sps_mts_inter_enabled_flag ) )* <br>     *&& tu_cbf_luma[ x0 ][ y0 ] && treeType != DUAL_TREE_CHROMA* <br>     *&& ( tbWidth <= 32 ) && ( tbHeight <= 32 ) )* | |
|     cu_mts_flag[ x0 ][ y0 ] | ae(v) |
|   if( tu_cbf_luma[ x0 ][ y0 ] ) | |
|     residual_coding( x0, y0, log2( tbWidth ), log2( tbHeight ), 0 ) | |
|   if( tu_cbf_cb[ x0 ][ y0 ] ) | |
|     residual_coding( x0, y0, log2( tbWidth / 2 ), log2( tbHeight / 2 ), 1 ) | |
|   if( tu_cbf_cr[ x0 ][ y0 ] ) | |
|     residual_coding( x0, y0, log2( tbWidth / 2 ), log2( tbHeight / 2 ), 2 ) | |
| } | |

| | Descriptor |
|---|---|
| residual_coding( x0, y0, log2TbWidth, log2TbHeight, cIdx ) { | |
| if( transform_skip_enabled_flag && ( cIdx != 0 \|\| cu_mts_flag[ x0 ][ y0 ] == 0 ) && ( log2TbWidth <= 2 ) && ( log2TbHeight <= 2 ) ) | |
|   transform_skip_flag[ x0 ][ y0 ][ cIdx ] | ae(v) |
| last_sig_coeff_x_prefix | ae(v) |
| last_sig_coeff_y_prefix | ae(v) |
| if( last_sig_coeff_x_prefix > 3 ) | |
|   last_sig_coeff_x_suffix | ae(v) |
| if( last_sig_coeff_y_prefix > 3 ) | |
|   last_sig_coeff_y_suffix | ae(v) |
| ..... | |

*FIG. 23A*

Continue from FIG. 23A

| |
|---|
| if( dep_quant_enabled_flag ) { |
|   QState = startQStateSb |
|   for( n = numSbCoeff - 1; n >= 0; n- - ) { |
|     xC = ( xS << log2SbSize ) + DiagScanOrder[ log2SbSize ][ log2SbSize ][ n ][ 0 ] |
|     yC = ( yS << log2SbSize ) + DiagScanOrder[ log2SbSize ][ log2SbSize ][ n ][ 1 ] |
|     if( sig_coeff_flag[ xC ][ yC ] ) |
|       TransCoeffLevel[ x0 ][ y0 ][ cIdx ][ xC ][ yC ] = <br>        ( 2 * AbsLevel[ xC ][ yC ] - ( QState > 1 ? 1 : 0 ) ) * <br>        ( 1 - 2 * coeff_sign_flag[ n ] ) |
|     QState = QStateTransTable[ QState ][ par_level_flag[ n ] ] |
|   } |
| } else { |
|   sumAbsLevel = 0 |
|   for( n = numSbCoeff - 1; n >= 0; n- - ) { |
|     xC = ( xS << log2SbSize ) + DiagScanOrder[ log2SbSize ][ log2SbSize ][ n ][ 0 ] |
|     yC = ( yS << log2SbSize ) + DiagScanOrder[ log2SbSize ][ log2SbSize ][ n ][ 1 ] |
|     if( sig_coeff_flag[ xC ][ yC ] ) { |

FIG. 23B

*Continue from FIG. 23B*

```
            TransCoeffLevel[ x0 ][ y0 ][ cIdx ][ xC ][ yC ] =
              AbsLevel[ xC ][ yC ] * ( 1 - 2 * coeff_sign_flag[ n ] )
          if( signHidden ) {
            sumAbsLevel += AbsLevel[ xC ][ yC ]
            if( ( n = = firstSigScanPosSb ) && ( sumAbsLevel % 2 ) = = 1 ) )
              TransCoeffLevel[ x0 ][ y0 ][ cIdx ][ xC ][ yC ] =
                - TransCoeffLevel[ x0 ][ y0 ][ cIdx ][ xC ][ yC ]
          }
        }
      }
      if( cu_mts_flag[ x0 ][ y0 ] && ( cIdx = = 0 ) &&
          transform_skip_flag[ x0 ][ y0 ][ cIdx ] &&
          ( ( CuPredMode[ x0 ][ y0 ] = = MODE_INTRA &&  numSigCoeff > 2 ) ||
          ( CuPredMode[ x0 ][ y0 ] = = MODE_INTER ) ) ) {
        mts_idx[ x0 ][ y0 ]                                              ae(v)
      }
    }
```

Inputs to this process are:

— a luma location ( xTbY, yTbY ) specifying the top-left sample of the current luma transform block relative to the top-left luma sample of the current picture, — a variable nTbW specifying the width of the current transform block, — a variable nTbH specifying the height of the current transform block, — a variable cIdx specifying the colour component of the current block, — an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

*FIG. 25A*

Continue from FIG. 25A

The variable implicitMtsEnabled is derived as follows:

— If sps_mts_enabled_flag is equal to 1 and one of the following conditions is true, implicitMtsEnabled is set equal to 1:

— IntraSubPartitionsSplitType is not equal to ISP_NO_SPLIT

— cu_sbt_flag is equal to 1 and Max( nTbW, nTbH ) is less than or equal to 32

— sps_explicit_mts_intra_enabled_flag and sps_explicit_mts_inter_enabled_flag are both equal to 0 and CuPredMode[ xTbY ][ yTbY ] is equal to MODE_INTRA Otherwise, implicitMtsEnabled is set equal to 0.

FIG. 25B

*Continue from FIG. 25B*

The variable trTypeHor specifying the horizontal transform kernel and the variable trTypeVer specifying the vertical transform kernel are derived as follows:

— If cIdx is greater than 0, trTypeHor and trTypeVer are set equal to 0.

— Otherwise, if implicitMtsEnabled is equal to 1, the following applies:

— If IntraSubPartitionsSplitType is not equal to ISP_NO_SPLIT, trTypeHor and trTypeVer are specified depending on intraPredMode.

— Otherwise, if cu_sbt_flag is equal to 1, trTypeHor and trTypeVer are specified depending on cu_sbt_horizontal_flag and cu_sbt_pos_flag.

— Otherwise (sps_explicit_mts_intra_enabled_flag and sps_explicit_mts_inter_enabled_flag are equal to 0), trTypeHor and trTypeVer are derived as follows:

trTypeHor = ( nTbW >= 4 && nTbW <= 16 && nTbH <= nTbW ) ? 1 : 0 trTypeVer = ( nTbH >= 4 && nTbH <= 16 && nTbH <= nTbW ) ? 1 : 0

FIG. 25C

Continue from FIG. 25C

- Otherwise, trTypeHor and trTypeVer are specified depending on tu_mts_idx[ xTbY ][ yTbY ].

The variables nonZeroW and nonZeroH are derived as follows:

nonZeroW = Min( nTbW, ( trTypeHor > 0 ) ? 16 : 32 )

nonZeroH = Min( nTbH, ( trTypeVer > 0 ) ? 16 : 32 )

FIG. 25D

*Continue from FIG. 25D*

The (nTbW)x(nTbH) array r of residual samples is derived as follows:

1. When nTbH is greater than 1, each (vertical) column of scaled transform coefficients d[ x ][ y ] with x = 0..nonZeroW − 1, y = 0..nonZeroH − 1 is transformed to e[ x ][ y ] with x = 0..nonZeroW − 1, y = 0..nTbH − 1 by invoking the one-dimensional transformation process for each column x = 0..nonZeroW − 1 with the height of the transform block nTbH, the non-zero height of the scaled transform coefficients nonZeroH, the list d[ x ][ y ] with y = 0..nonZeroH − 1 and the transform type variable trType set equal to trTypeVer as inputs, and the output is the list e[ x ][ y ] with y = 0..nTbH − 1.

2. When nTbH and nTbW are both greater than 1, the intermediate sample values g[ x ][ y ] with x = 0..nonZeroW − 1, y = 0..nTbH − 1 are derived as follows:

g[ x ][ y ] = Clip3( CoeffMin, CoeffMax, ( e[ x ][ y ] + 64 ) >> 7 )

3. When nTbW is greater than 1, each (horizontal) row of the resulting array g[ x ][ y ] with x = 0..nonZeroW − 1, y = 0..nTbH − 1 is transformed to r[ x ][ y ] with x = 0..nTbW − 1, y = 0..nTbH − 1 by invoking the one-dimensional transformation process for each row y = 0..nTbH − 1 with the width of the transform block nTbW, the non-zero width of the resulting array g[ x ][ y ] nonZeroW, the list g[ x ][ y ] with x = 0..nonZeroW − 1 and the transform type variable trType set equal to trTypeHor as inputs, and the output is the list r[ x ][ y ] with x = 0..nTbW − 1.

*FIG. 25E*

| Intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| Intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| Intra mode | 51 | 52 | 53 | 54 | 55 | 56 | 57 | 58 | 59 | 60 | 61 | 62 | 63 | 64 | 65 | 66 | 67(LM) |
| set | 17 | 16 | 15 | 14 | 13 | 12 | 11 | 10 | 9 | 8 | 7 | 6 | 5 | 4 | 3 | 2 | NULL |

*FIG. 26*

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

FIG. 31

$$T_{R\times N} = \begin{bmatrix} t_{11} & t_{12} & t_{13} & \cdots & t_{1N} \\ t_{21} & t_{22} & t_{23} & \cdots & t_{2N} \\ \vdots & & & \ddots & \vdots \\ t_{R1} & t_{R2} & t_{R3} & \cdots & t_{RN} \end{bmatrix}$$

FIG. 36

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

FIG. 38

|  | VTM-6 | JVET-O0292 | JVET-O0349 |
|---|---|---|---|
| lfnstIdx 0 | No LFNST | No LFNST | No LFNST |
| lfnstIdx 1 | lfnstIdx = 1 | If intraMode <35<br>    coreIdx = intraMode % 2 == 0 ? 1 : 2<br>Otherwise,<br>    coreIdx = intraMode % 2 == 0 ? 2 : 1 | coreIdx =<br>( intramode % 2 ) + 1 |
| lfnstIdx 2 | lfnstIdx = 2 | — | — |

FIG. 39

METHOD AND APPARATUS FOR VIDEO CODING

INCORPORATION BY REFERENCE

This present application claims the benefit of priority to U.S. Provisional Application No. 62/821,657, "CONTEXT MODELING FOR ENTROPY CODING OF SECONDARY TRANSFORM INDEX OR FLAG" filed on Mar. 21, 2019 and U.S. Provisional Application No. 62/910,127, "BLOCK SIZE RESTRICTION OF LFNST" filed on Oct. 3, 2019. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes receiving circuitry and processing circuitry. For example, the processing circuitry receives a bitstream including bits corresponding to residues of a block in a coded picture and parses the bitstream to extract at least one bit that is indicative of a potential usage of an angular prediction of the block. Further, the processing circuitry determines context for coding information of a secondary transform based on the at least one bit that is indicative of the potential usage of the angular prediction of the block, and decode the bits corresponding to the residues of the block using the secondary transform information that is decoded based on the context.

In an embodiment, the processing circuitry parses the bitstream to extract at least one of a flag for most probable mode (MPM) and an index for MPM.

In another embodiment, the processing circuitry determines the context for coding at least one of a flag for the secondary transform and an index for the secondary transform based on the at least one bit that is indicative of the potential usage of the angular prediction of the block.

In another embodiment, the processing circuitry parses the bitstream to extract an index for most probable mode (MPM), and determines the context for coding the information for the secondary transform based on at least one of a first bin and a second bin of the index for MPM.

In some embodiments, the processing circuitry parses the bitstream to extract an index for a reference line of the block, and determines the context for coding the information for the secondary transform based on at least one of a first bin and a second bin of the index for the reference line of the block.

In some embodiments, the processing circuitry parses the bitstream to extract an index for an intra sub partition of the block and determines the context for coding the information for the secondary transform based on at least one of a first bin and a second bin of the index for the intra sub-partition of the block.

In some embodiments, the processing circuitry parses the bitstream to extract a first flag indicating whether an angular mode is applied for prediction of the block and determines the context for coding the information for the secondary transform based on the first flag. In an example, the processing circuitry parses the bitstream to extract a second flag indicating whether a planar mode or a DC mode is applied for prediction of the block when the first flag indicates no angular mode is applied for the prediction of the block. Then, the processing circuitry determines the context for coding the information for the secondary transform based on the second flag.

In some embodiments, the processing circuitry disables the secondary transform when a size of the block is smaller than a threshold.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

Figure 8:
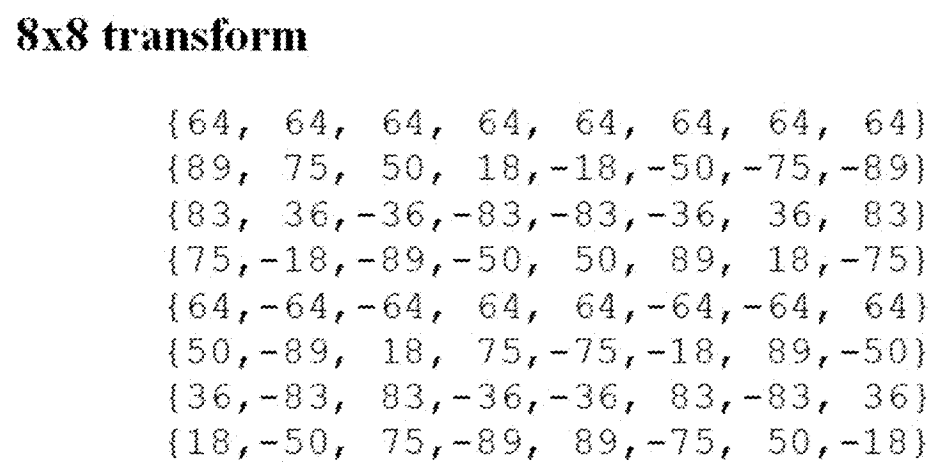
Figure 9:
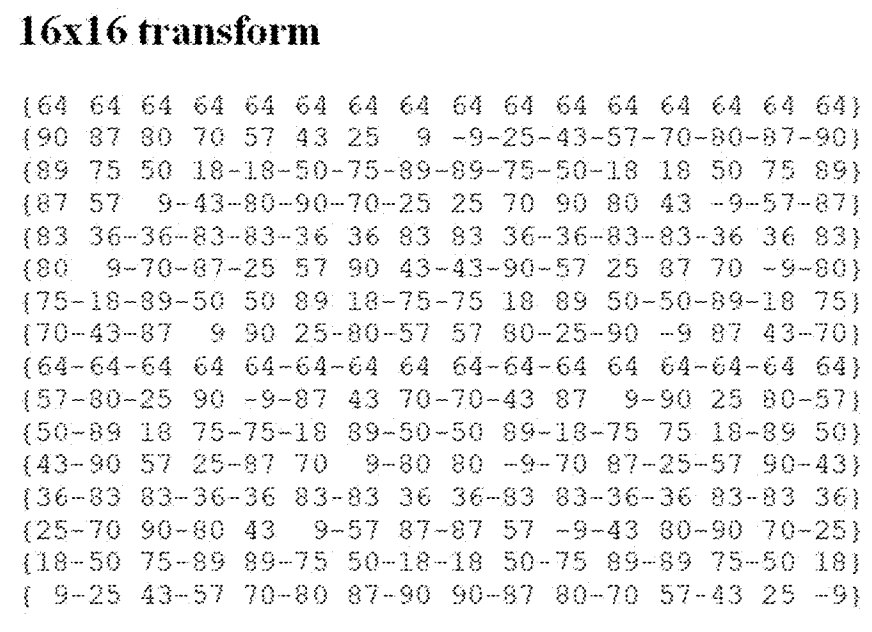
Figure 10:
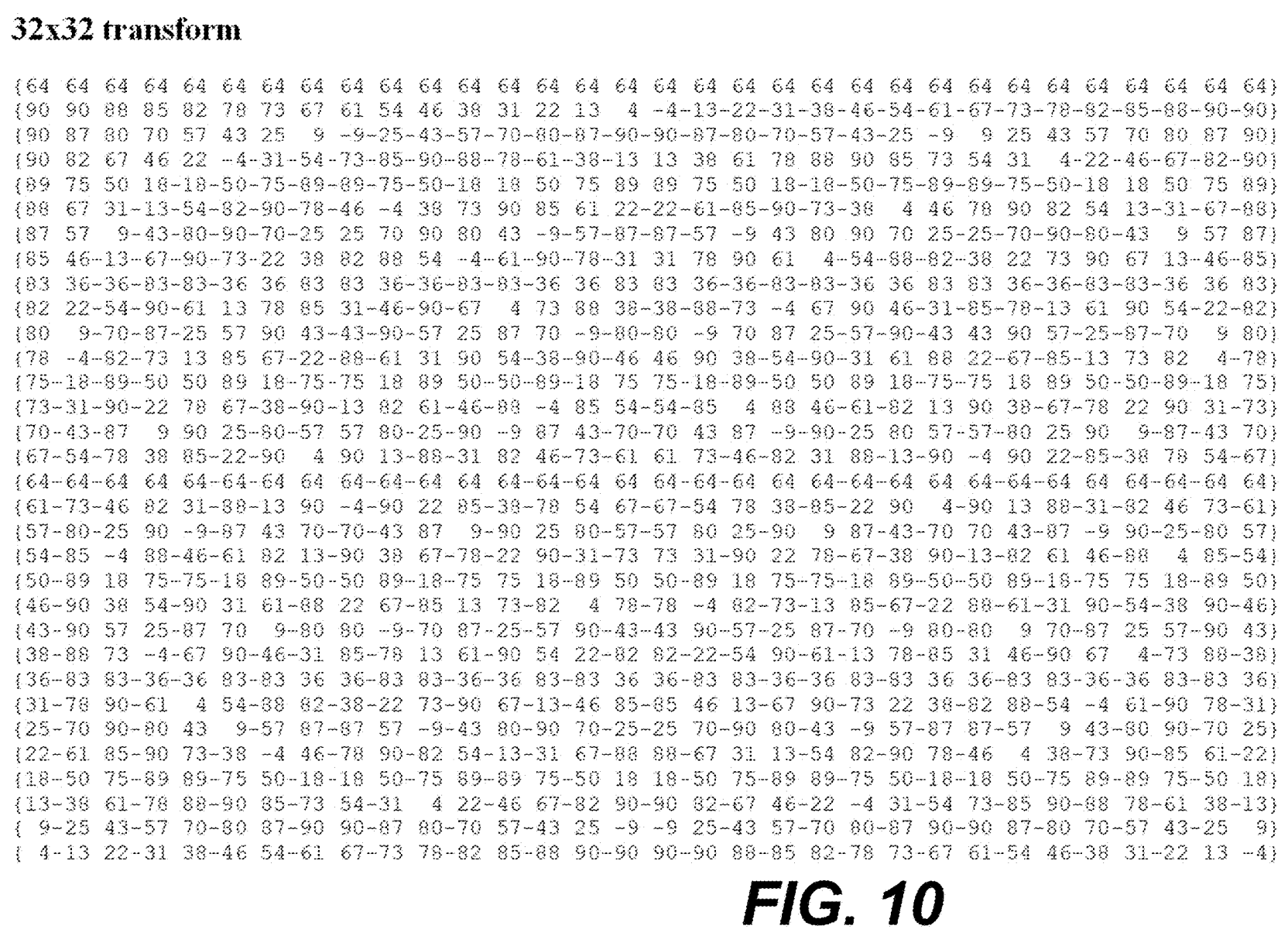

FIGS. 7-10 show transform core matrices in some examples.

Figure 11A:
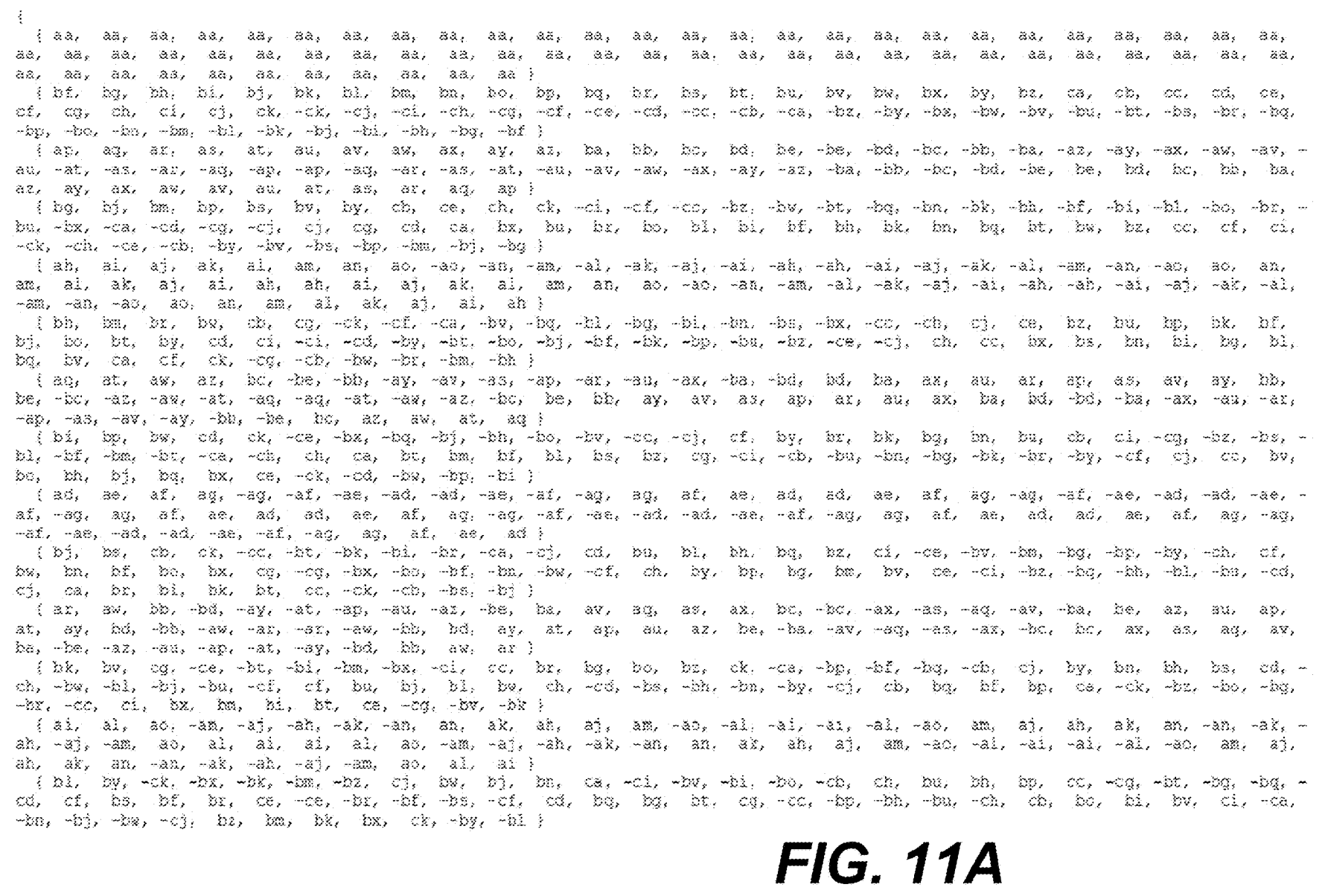
Figure 11B:
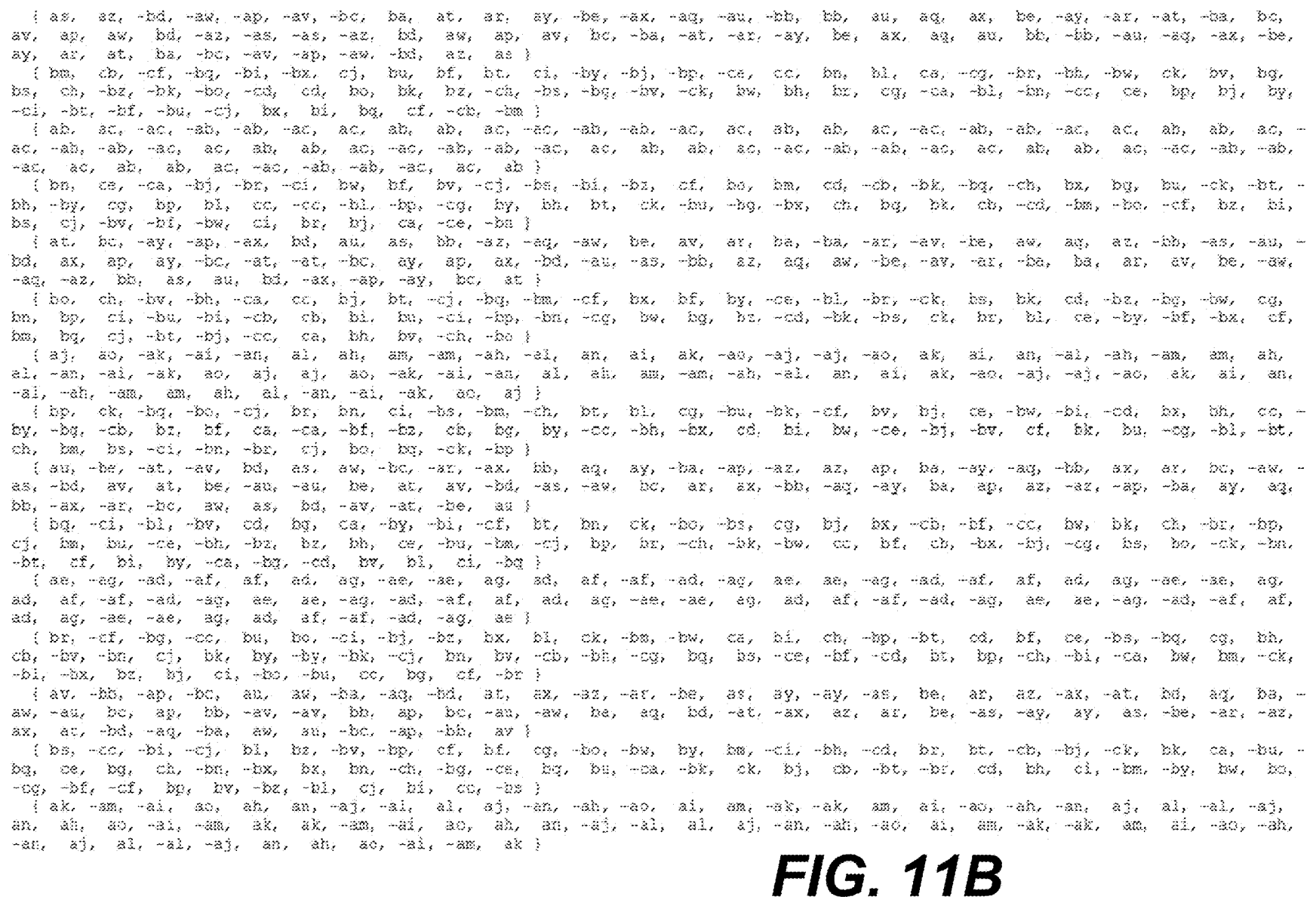
Figure 11C:
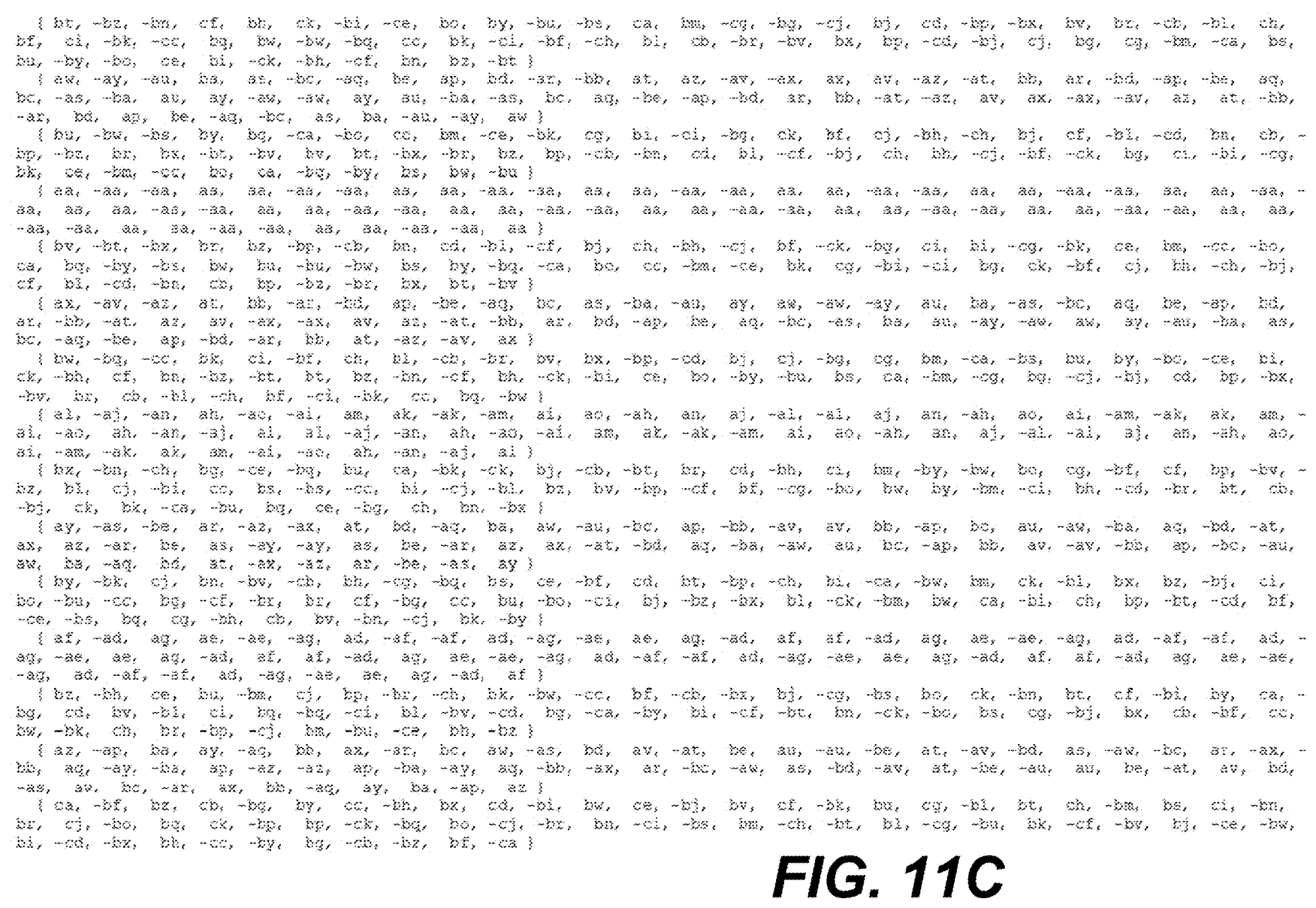
Figure 11D:
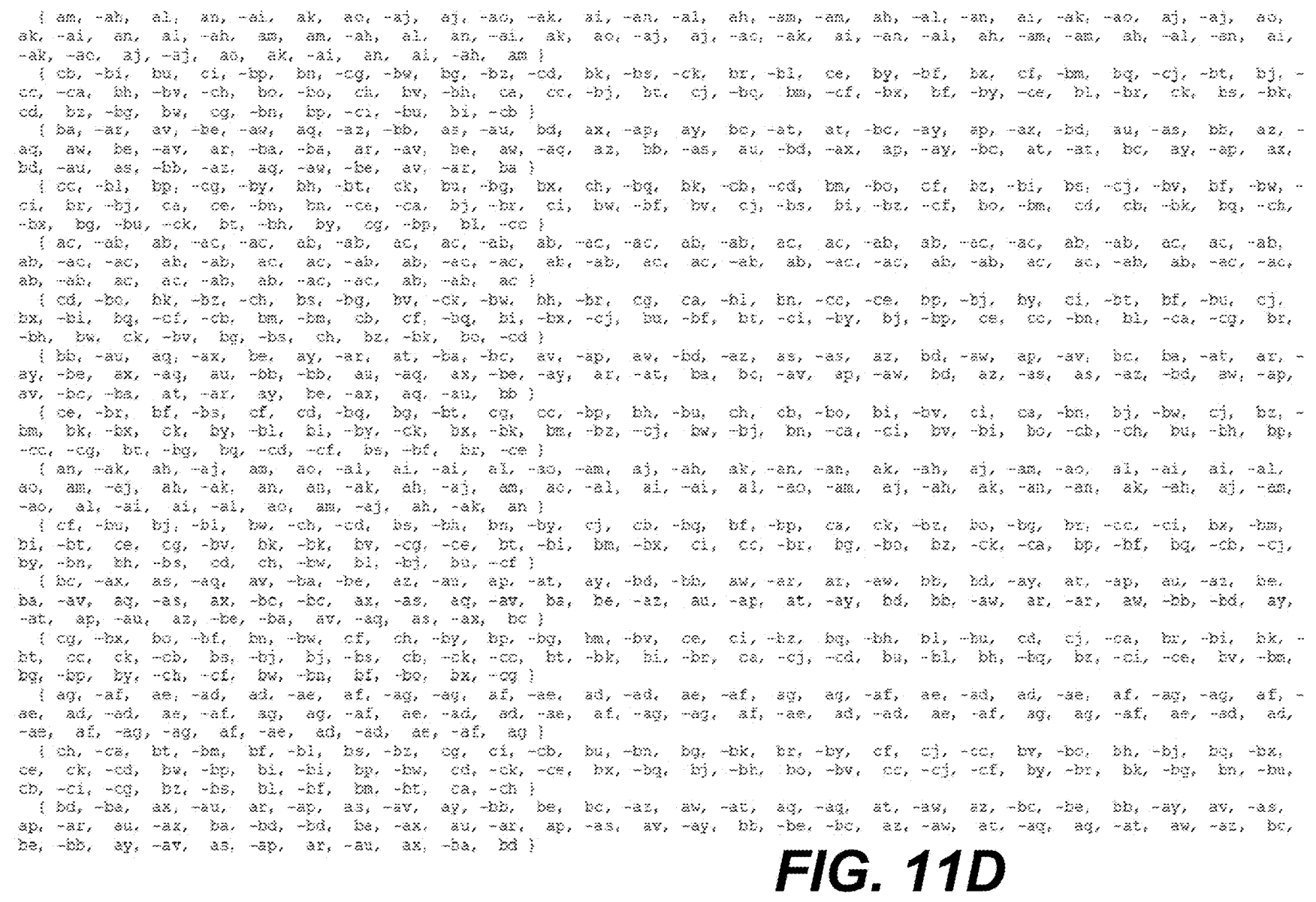
Figure 11E:
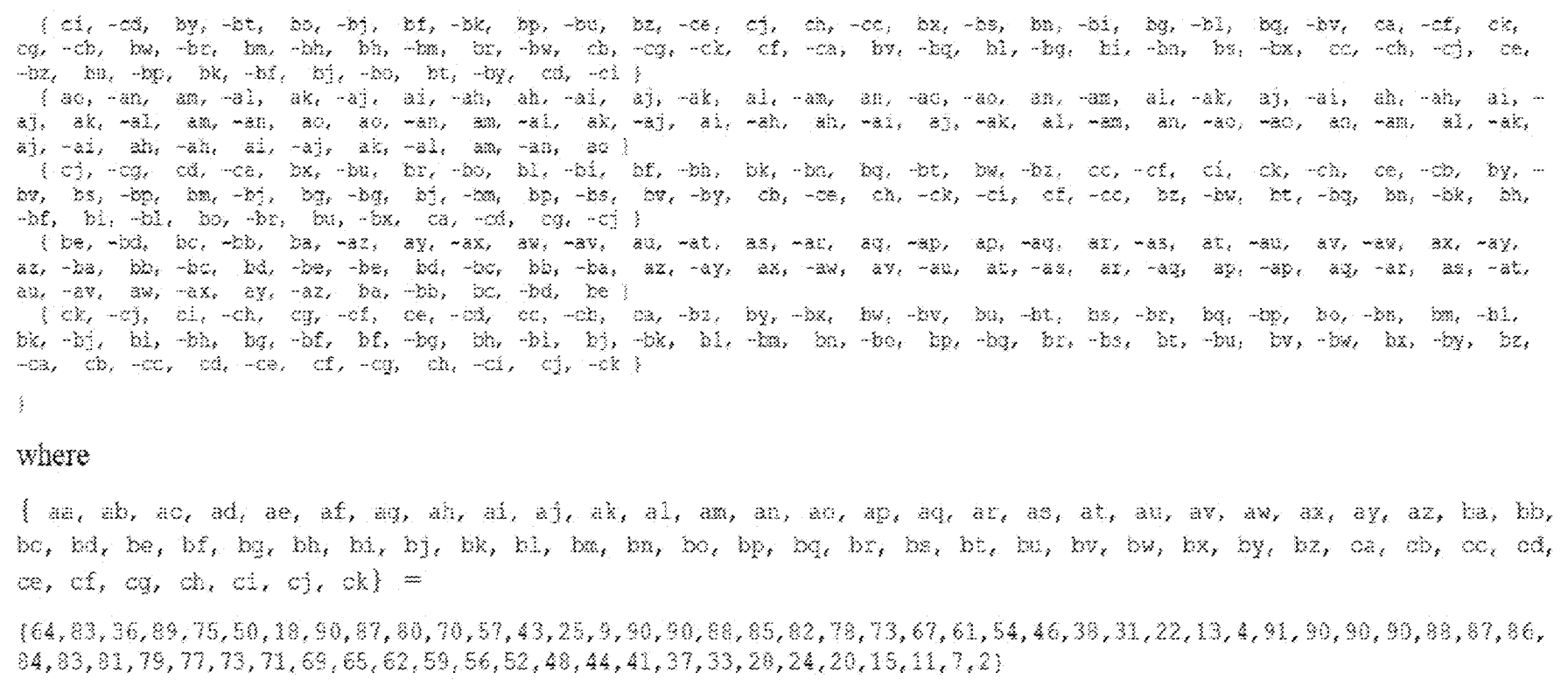

FIGS. 11A-11E show a 64×64 transform core matrix.

FIG. 12 shows transform basis functions of the selected DST/DCT transforms.

FIG. 13 shows a table illustrating a mapping relationship between indices and transform types.

FIGS. 14-17 show transform core matrices of DST-7 transform.

Figure 21:
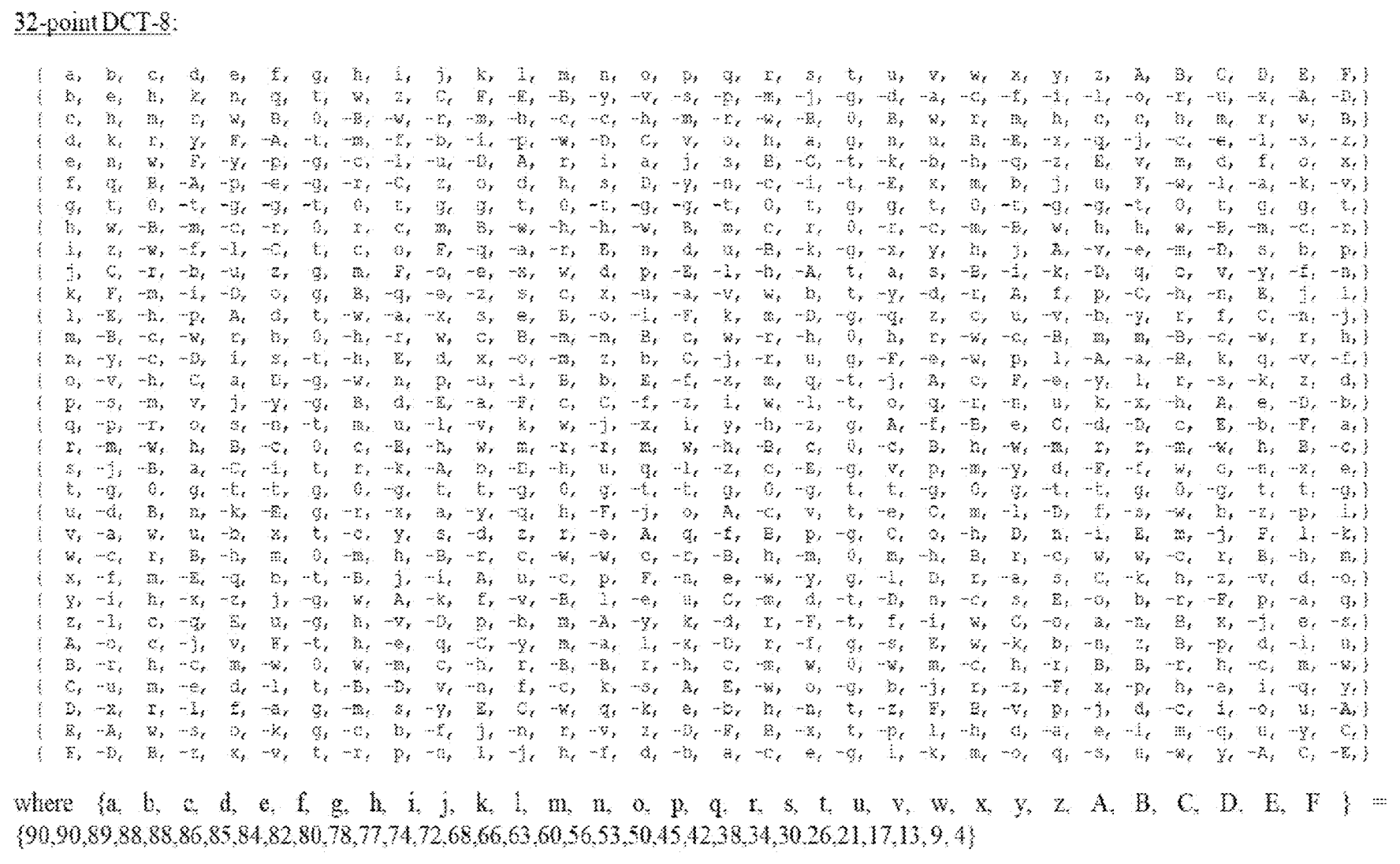

FIGS. 18-21 show transform core matrices of DCT-8 transform.

FIG. 22 shows an example of transform unit syntax according to some embodiments of the disclosure.

FIGS. 23A-23C shows an example of residual coding syntax according to some embodiments of the disclosure.

FIGS. 25A-25E show an example of a transformation process for scaled transform coefficients according to some examples.

FIG. 26 shows an exemplary mapping from an intra prediction mode to a respective transform set.

FIG. 31 shows the number of sub-partitions depending on the block size.

FIG. 36 shows a reduced secondary transform matrix.

FIG. 38 shows a table that is used for transform set selection.

FIG. 39 shows a table for determining an index for secondary transform.

DETAILED DESCRIPTION OF EMBODIMENTS

Figure 1:
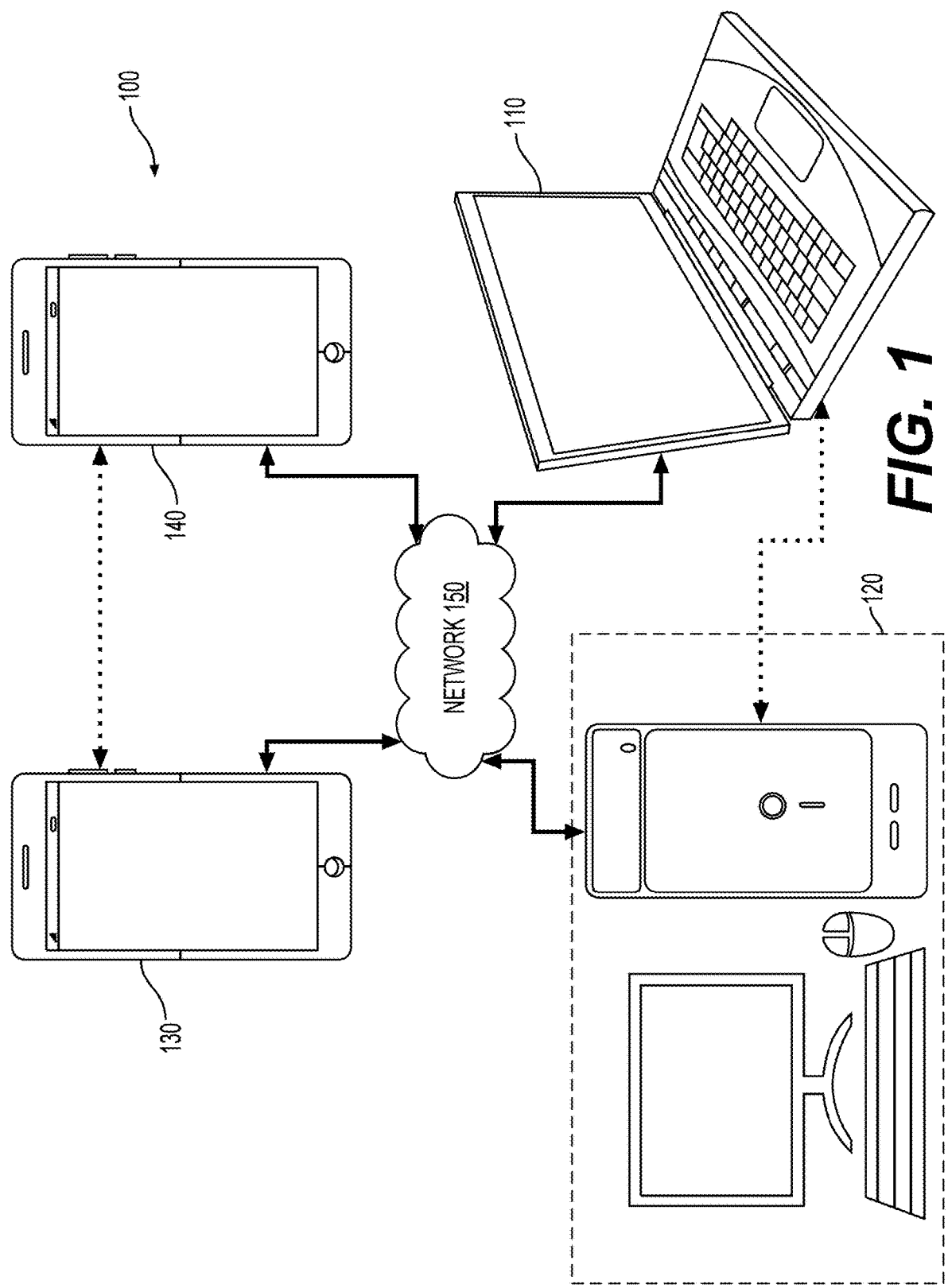
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
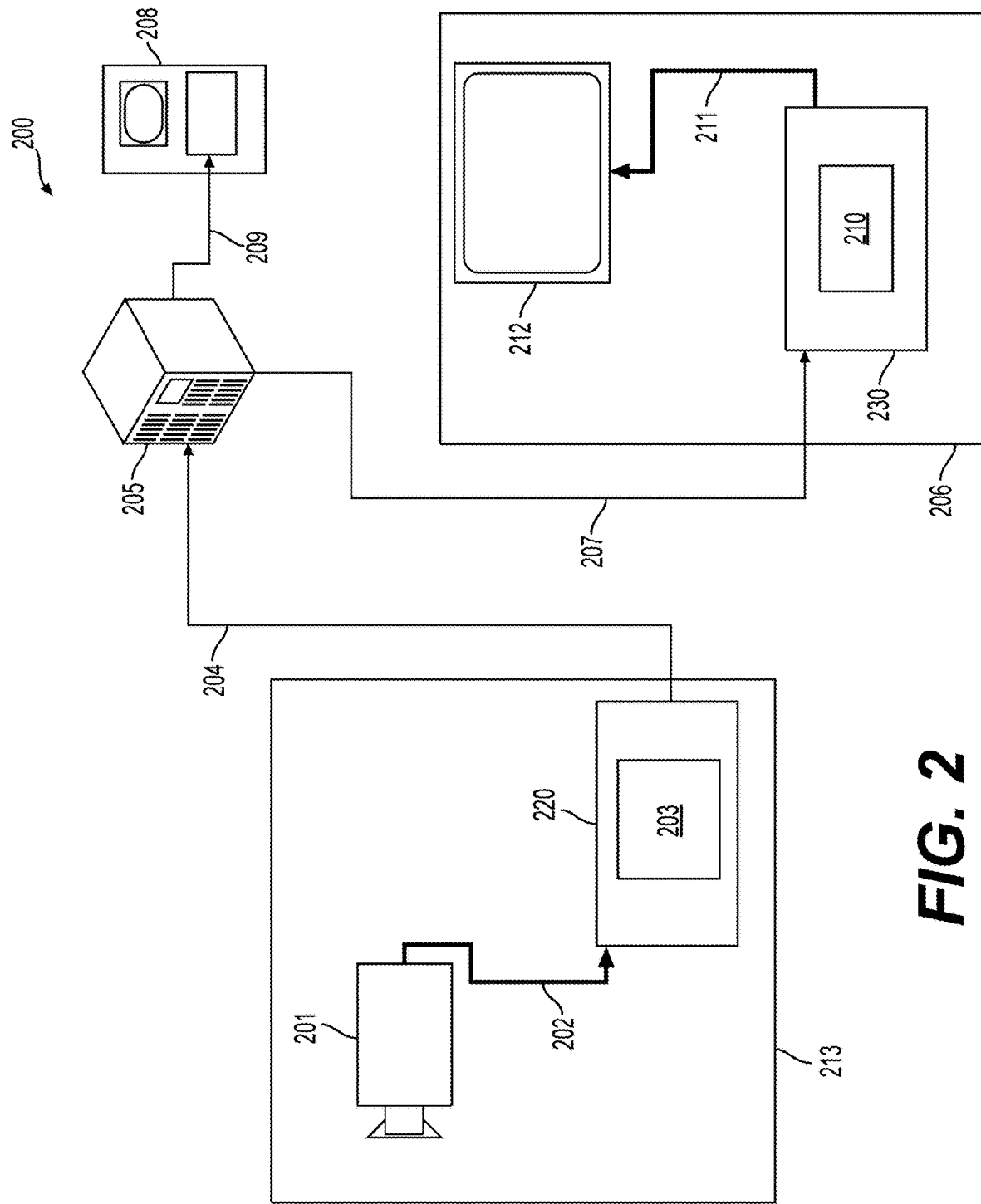
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
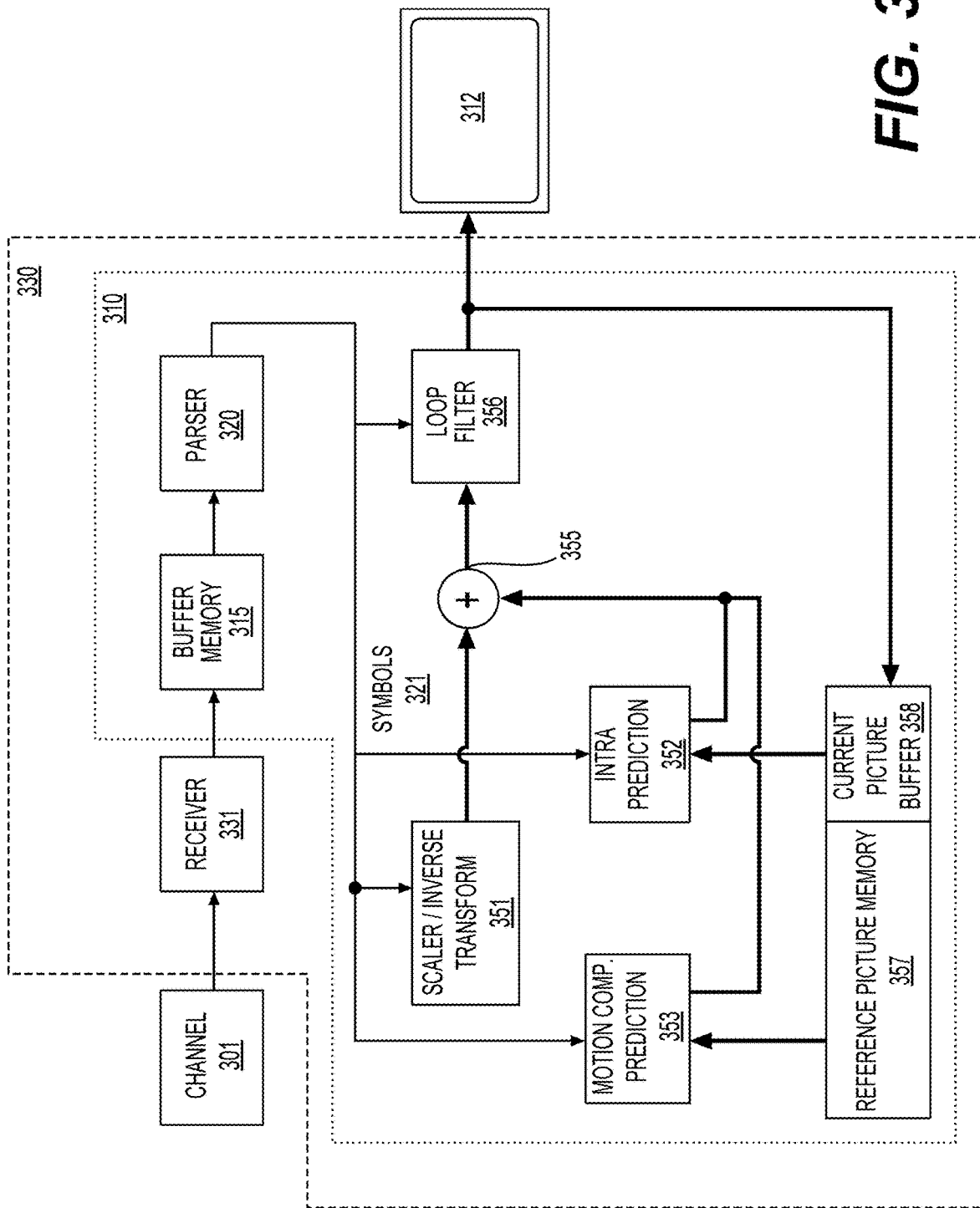
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI)

parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
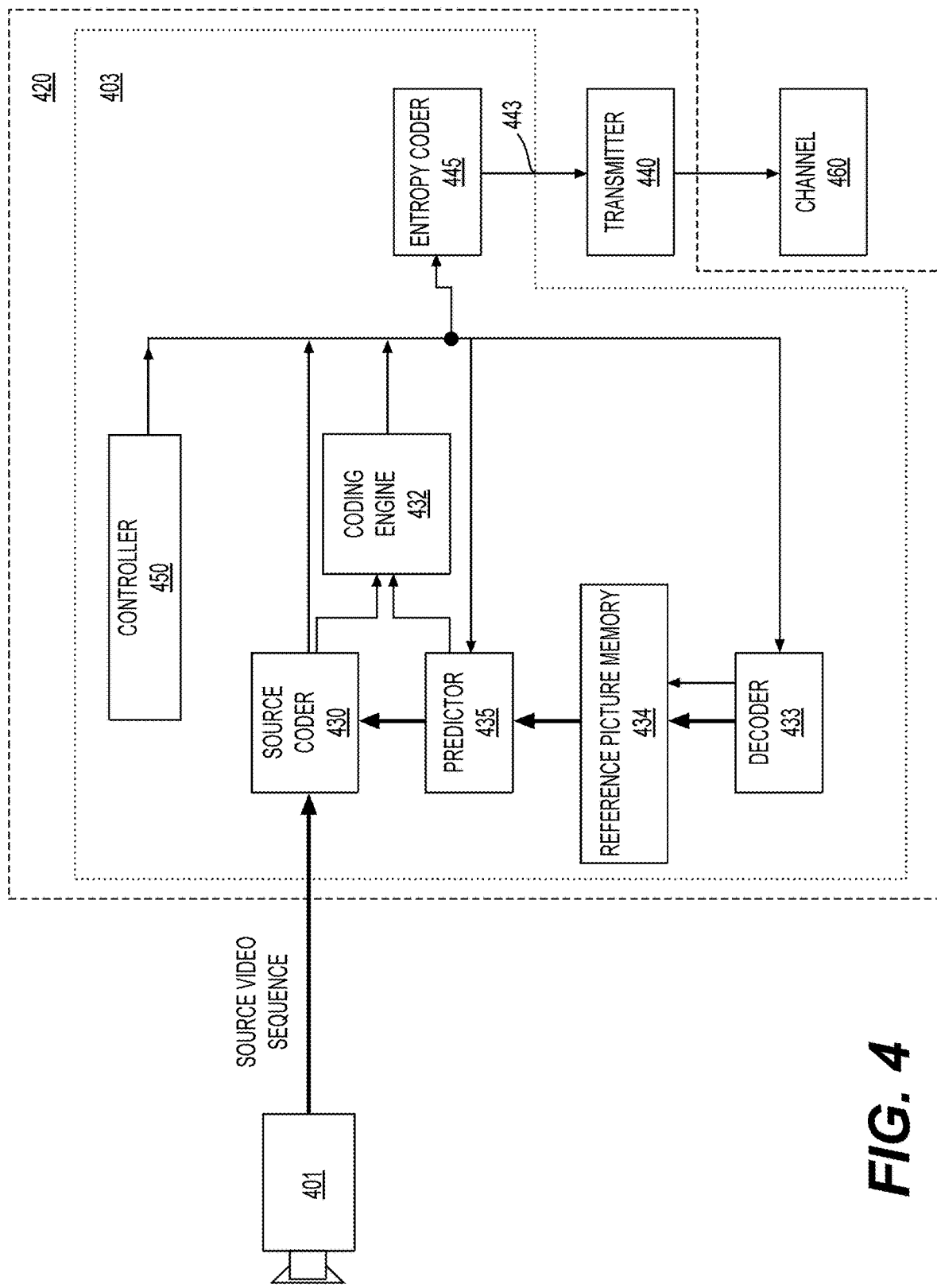
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
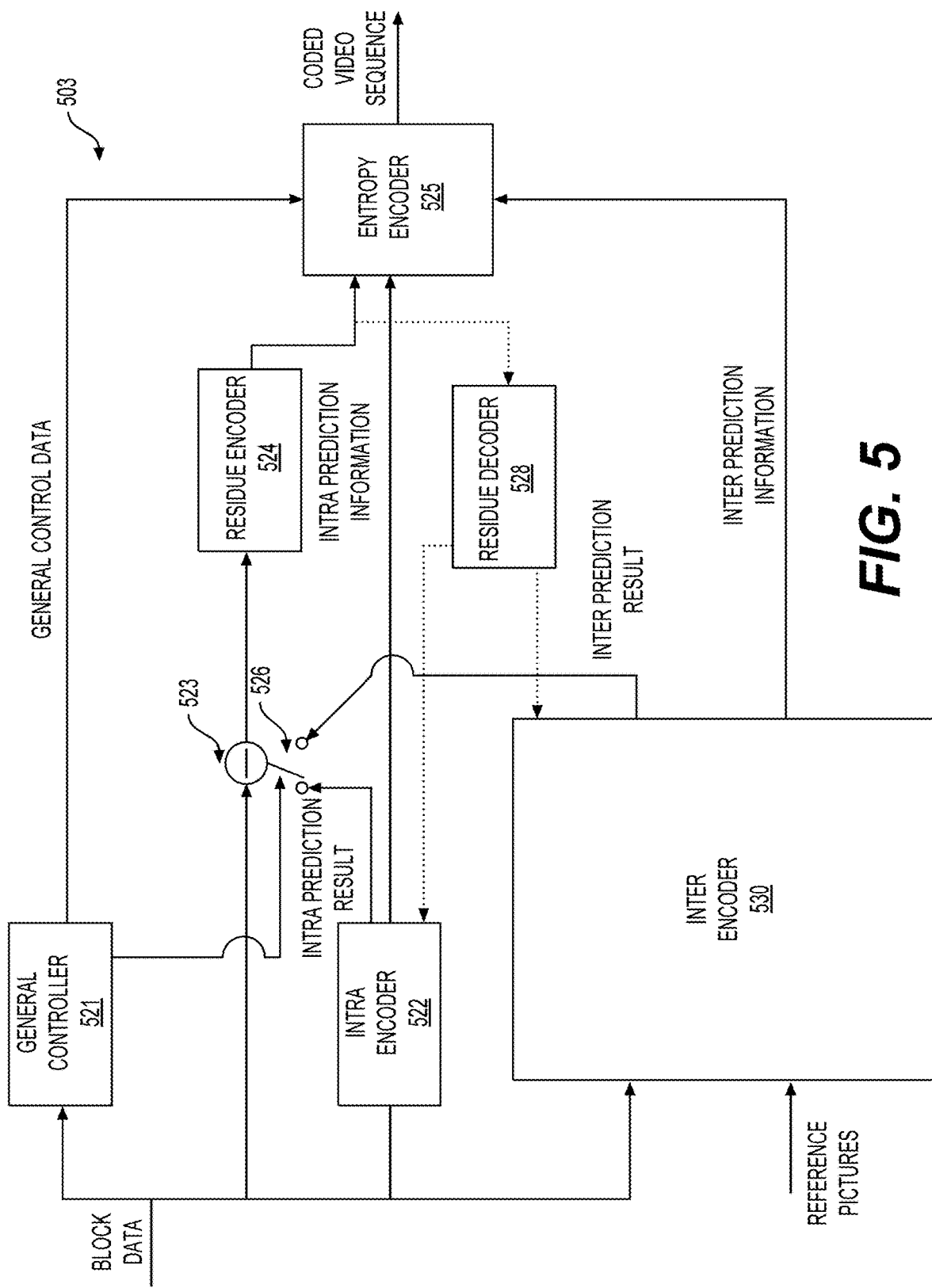
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
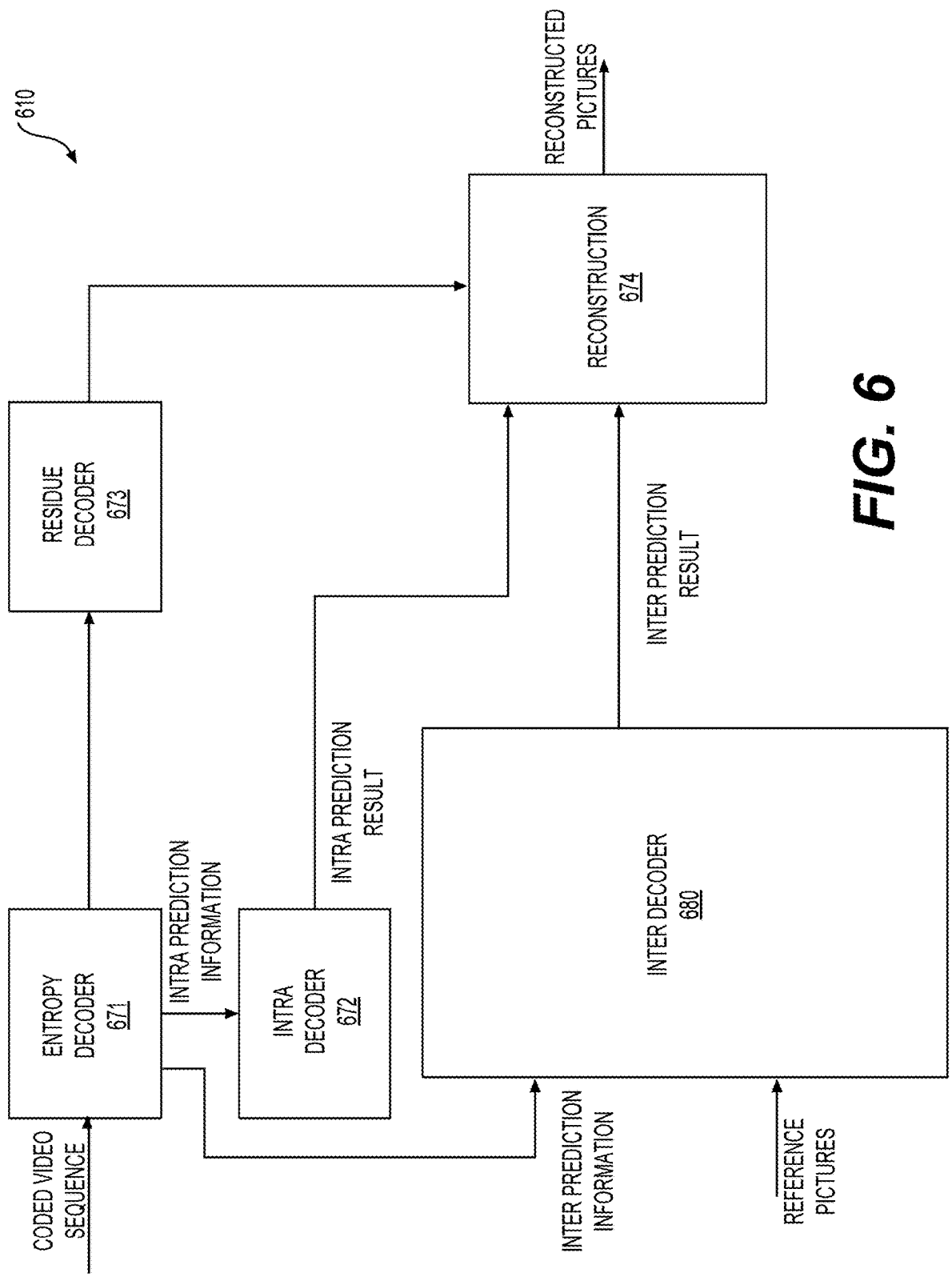
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide context modeling techniques for entropy coding of secondary transform index or flag. Specifically, in some embodiments, a method of using MPM index or flag as the context modeling for secondary index entropy coding is used.

According to some aspects of the disclosure, primary and secondary transforms can be used in the coding of residual signals. In some embodiments, 4-point, 8-point, 16-point and 32-point type 2 discrete cosine transform (DCT-2) transforms can be used as primary transform. FIGS. 7-10 show transform core matrices of 4-point, 8-point, 16-point, and 32-point DCT-2, respectively. Elements of those transform core matrices can be represented using 8-bit integers, and thus those transform core matrices are referred to as 8-bit transform cores. As shown, the transform core matrix of a smaller DCT-2 is a part of that of a larger DCT-2.

The DCT-2 core matrices show symmetry/anti-symmetry characteristics. Accordingly, a so-called "partial butterfly" implementation can be supported to reduce the number of operation counts (multiplications, adds/subs, shifts). Identical results of matrix multiplication can be obtained using the partial butterfly implementation.

In some embodiments, in addition to 4-point, 8-point, 16-point and 32-point DCT-2 transforms described above, additional 2-point and 64-point DCT-2 are used. FIGS. 11A-11E show a 64×64 transform core matrix of the 64-point DCT-2 transform.

In some embodiments, in addition to DCT-2 and 4×4 discrete sine transform type IIV (DST-7) transforms, an adaptive multiple transform (AMT) (also known as enhanced multiple transform (EMT), or multiple transform selection (MTS)) is used for residual coding of both inter and intra coded blocks. The AMT uses multiple selected transforms from discrete cosine transform (DCT)/discrete sine transform (DST) families in addition to DCT-2 transforms, such as transform core matrices of DST-7, or DCT-8 transform.

FIG. 12 shows transform basis functions of the selected DST/DCT transforms.

In some embodiments, the DST/DCT transform core matrices used in AMT are represented with 8-bit representation. In some embodiments, AMT is applied to CUs with both width and height smaller than or equal to 32. Whether to apply AMT or not can be controlled by a flag denoted by mts_flag. For example, when the mts_flag is equal to 0, only DCT-2 is applied to coding a residue block. When the mts_flag is equal to 1, an index, denoted by mts_idx, can further be signaled using 2 bins to specify a horizontal and vertical transforms to be used.

FIG. 13 shows a table (1300) illustrating a mapping relationship between an mts_idx value and respective horizontal or vertical transforms. The row (1301) with the mts_idx having a value of −1 corresponds to the scenario where the mts_flag is equal to 0, and DCT-2 transform is used. The rows (1302)-(1305) with the mts_idx having a value of 0, 1, 2, or 3 correspond to the scenario where the mts_flag is equal to 1. In the right two columns of the table (1300), 0 represents a transform type of DCT-2, 1 represents a transform type of DST-7, and 2 represents a transform type of DCT 8.

FIGS. 14-17 show transform core matrices of DST-7 transform. FIGS. 18-21 show transform core matrices of DCT-8 transform.

In some examples, such as in VVC, when both the height and width of the coding block is smaller than or equal to 64, the transform size is the same as the coding block size. When either the height or width of the coding block is larger than 64, when doing a transform (such as an inverse transform, an inverse primary transform, or the like) or intra prediction, the coding block is further split into multiple sub-blocks, where the width and height of each sub-block is smaller than or equal to 64. One transform can be performed on each sub-block.

FIG. 22 shows an example of transform unit syntax according to some embodiments of the disclosure. The related syntax and semantics of MTS in some examples (e.g., in VVC) can be described as shown by (2210).

FIGS. 23A-23C shows an example of residual coding syntax according to some embodiments of the disclosure. The related syntax and semantics of MTS in some examples (e.g., in VVC) can be described as shown by (2310).

In some examples, transform unit semantics and residual coding semantics may specify MTS information. In an example, cu_mts_flag[x0][y0] is used to indicate whether MTS is applied or not. For example, when cu_mts_flag[x0][y0] is equal to 1, multiple transform selection is applied to the residual samples of the associated luma transform block. When cu_mts_flag[x0][y0] equal to 0, multiple transform selection is not applied to the residual samples of the associated luma transform block. The array indices x0, y0 specify the location (x0, y0) of the top-left luma sample of the considered transform block relative to the top-left luma sample of the picture. In some examples, when cu_mts_flag[x0][y0] is not present, the value cu_mts_flag[x0][y0] of is inferred to be equal to 0.

In another example, mts_idx[x0][y0] is used to specify which transform kernels are applied to the luma residual samples along the horizontal and vertical direction of the current transform block. The array indices x0, y0 specify the location (x0, y0) of the top-left luma sample of the considered transform block relative to the top-left luma sample of the picture. When mts_idx[x0][y0] is not present, the value of mts_idx[x0][y0] is inferred to be equal to −1.

Figures 24A, 24B:
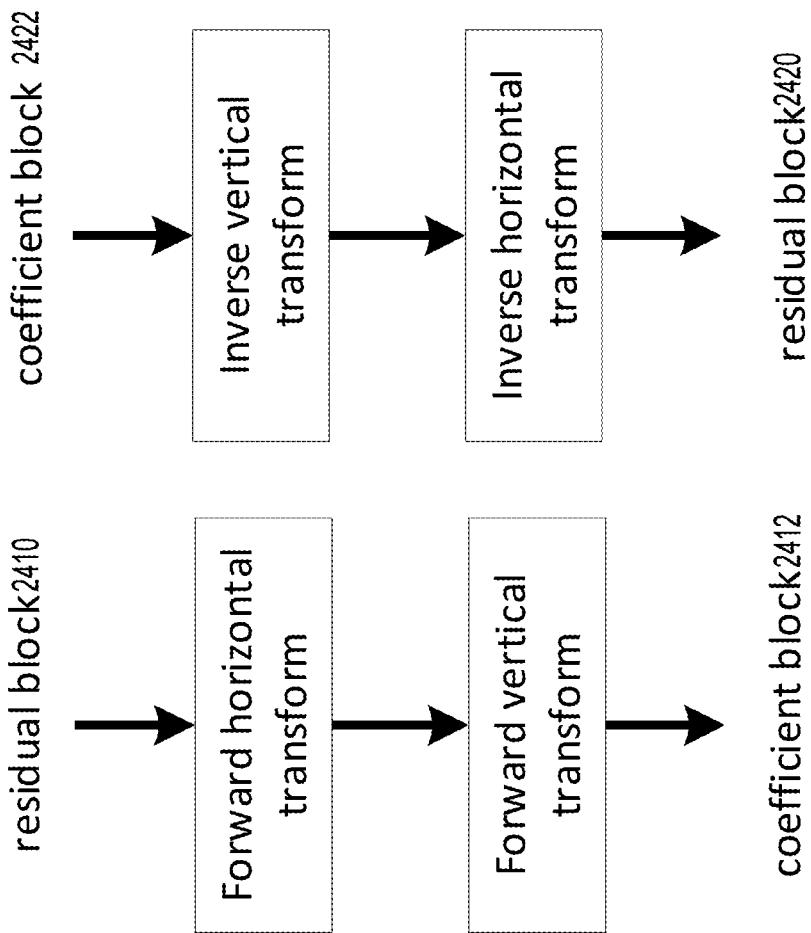
FIGS. 24A-24B show examples of forward transform.

FIG. 24A shows an exemplary forward transform (also referred to as a forward primary transform) performed by an encoder. In some examples, the forward transform can be performed by a forward horizontal transform and a forward vertical transform, and thus the forward transform is separable and is separate into the forward horizontal transform and the forward vertical transform. In an example, the forward horizontal transform is applied first to a residual block (2410) having residual data to obtain a transform intermediate block. Subsequently, the forward vertical transform is applied to the transform intermediate block to obtain a coefficient block (2412) having transform coefficients.

FIG. 24B shows an exemplary backward transform (also referred to as an inverse primary transform or an inverse transform) performed by a decoder. Generally speaking, the inverse transform matches the forward transform. The inverse primary transform can be performed by an inverse primary horizontal transform (also referred to as an inverse horizontal transform) and an inverse primary vertical transform (also referred to as an inverse vertical transform). To match the forward transform, an order of applying the inverse horizontal and vertical transforms is switched in the inverse transform. Accordingly, the inverse vertical transform is applied first to a coefficient block (2422) to obtain an inverse transform intermediate block. Subsequently, the inverse horizontal transform is applied to the inverse transform intermediate block to obtain a residual block (2420).

Generally, for a primary transform, at an encoder side, a forward primary transform is performed; and at a decoder side, an inverse primary transform is performed. When the primary transform is separable, in an example, to perform the forward primary transform, a forward horizontal transform and a forward vertical transform are performed; and to perform the inverse primary transform, an inverse vertical transform and an inverse horizontal transform are performed.

FIGS. 25A-25E show an example of a transformation process for scaled transform coefficients according to some examples.

In some embodiments, a secondary transform can be performed with the primary transform. The second transform can be a non-separable transform that cannot be separate as a vertical transform and a horizontal transform. Generally, using a separable transform that is performed as a horizontal transform and a vertical transform can catch the correlations in the horizontal direction and vertical direction; and using non-separable transform can additional catch the correlations in other directions, such as diagonal directions, and the like. Non-separable transform includes more computation than the separable transform.

In an embodiment, the non-separable secondary transform can be mode-dependent, and is referred to as a mode-dependent non-separable secondary transform (NSST). In some examples, NSST can be performed between a forward core (primary) transform and a quantization at an encoder side and between a de-quantization and an inverse core (primary) transform at a decoder side. For example, to keep a low complexity, a NSST is applied to low frequency coefficients after a primary transform (or a core transform). When both a width (W) and a height (H) of a transform coefficient block are larger than or equal to 8, an 8×8 NSST is applied to a top-left 8×8 region of the transform coefficients block. Otherwise, when either the width W or the height H of the transform coefficient block is 4, a 4×4 NSST is applied, and the 4×4 NSST is performed on a top-left min(8,W)×min(8,H) region of the transform coefficient block. The above transform selection method is applied for both luma and chroma components in an example.

Specifically, in an embodiment, a matrix multiplication implementation of a NSST is described as follows using a 4×4 input block as an example. The 4×4 input block X is shown as in (Eq. 1)

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Eq. 1)}$$

Then, the input block X can be represented as a vector $\vec{X}$ in (Eq. 2) where $$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \quad \text{(Eq. 2)}$$

In some embodiment, the non-separable transform is calculated as $\vec{F} = T \cdot \vec{X}$, where $\vec{F}$ denotes a transform coefficient vector, and T denotes a 16×16 transform matrix. The 16×1 transform coefficient vector $\vec{F}$ is subsequently reorganized as a 4×4 block using a scanning order (for example, a horizontal scanning order, a vertical scanning order or a diagonal scanning order) for the input block X. Coefficients with smaller indices can be placed with smaller scanning indices in the 4×4 coefficient block. In some embodiments, a Hypercube-Givens Transform (HyGT) with a butterfly implementation can be used instead of the matrix multiplication described above to reduce the complexity of the NSST.

In some implementation examples, 35×3 non-separable secondary transforms are available for both 4×4 and 8×8 block sizes, where 35 is a number of transform sets associated with the intra prediction modes, and 3 is a number of NSST candidates for each intra prediction mode.

FIG. 26 shows an exemplary mapping 2600 from an intra prediction mode to a respective transform set. A transform set applied to luma/chroma transform coefficients is specified by a corresponding luma/chroma intra prediction mode, according to the mapping 2600 from an intra prediction mode to a transform set index. For an intra prediction mode larger than 34, which corresponds to a diagonal prediction direction, a transform coefficient block is transposed before/after the NSST at the encoder/decoder, respectively.

For each transform set, a selected NSST candidate can be further specified by an explicitly signaled CU level NSST index. The CU level NSST index is signaled in a bitstream for each intra coded CU after transform coefficients and a truncated unary binarization is used for the CU level NSST index. For example, a truncated value is 2 for the planar or the DC mode (planar and DC modes are referred to as non-angular prediction mode), and 3 for an angular intra prediction mode. In an example, the CU level NSST index is signaled only when there is more than one non-zero coefficient in the CU. The default value is zero and not signaled, indicating that a NSST is not applied to the CU. Each of values 1-3 indicates which NSST candidate is to be applied from the transform set.

In some embodiments, a NSST is not applied for a block coded with a transform skip mode. When the CU level NSST index is signaled for a CU and not equal to zero, a NSST is not used for a block that is coded with the transform skip mode in the CU. When the CU with blocks of all components are coded in a transform skip mode or a number of non-zero coefficients of non-transform-skip mode CBs is less than 2, the CU level NSST index is not signaled for the CU.

Figure 27:
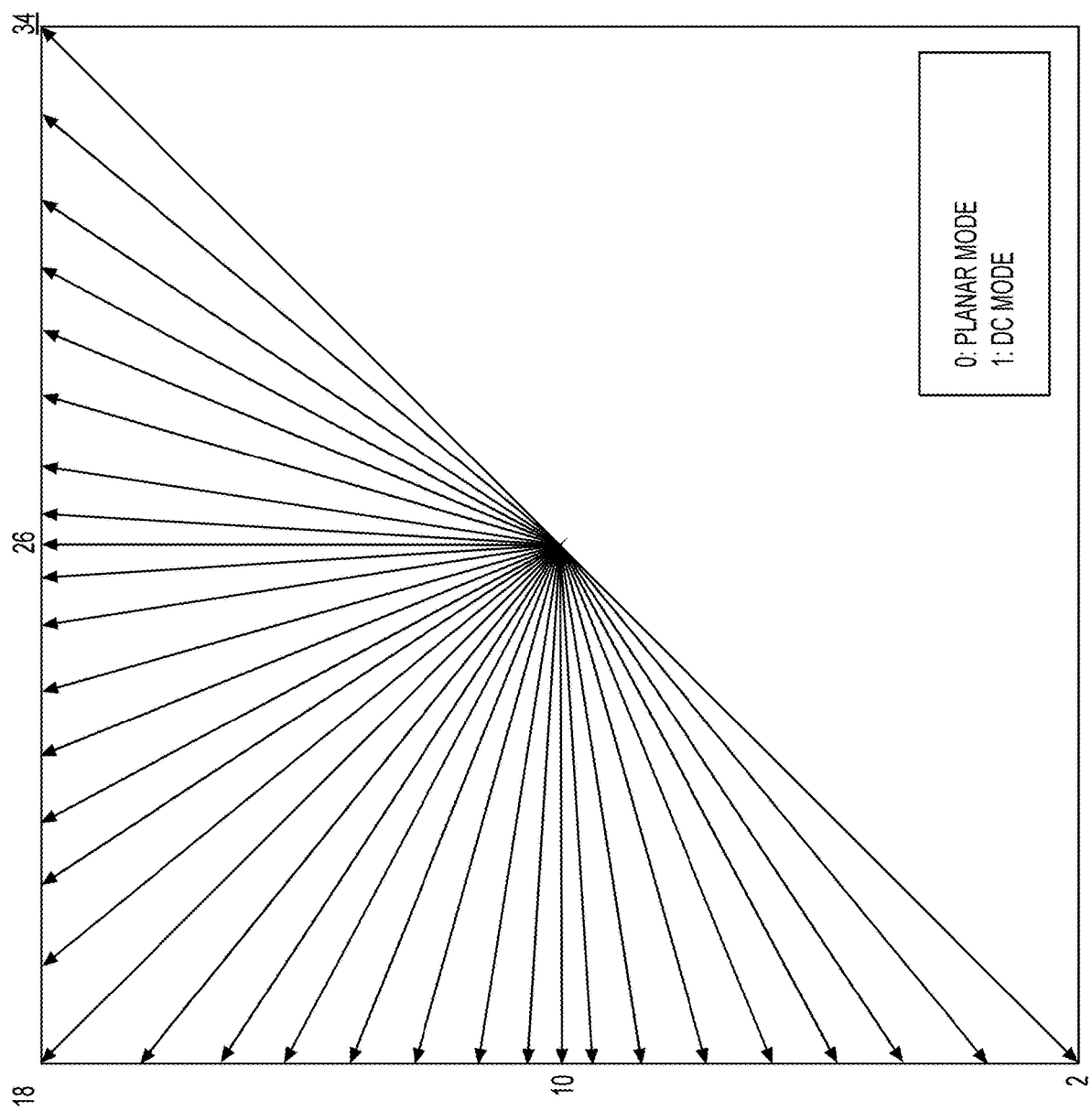
FIG. 27 shows an illustration of exemplary intra prediction directions and the intra prediction modes used in HEVC

FIG. 27 shows an illustration of exemplary intra prediction directions and the intra prediction modes used in HEVC. In HEVC, there are total 35 intra prediction modes (mode 0 to mode 34). The mode 0 and mode 1 are non-directional modes, among which mode 0 is planar mode and mode 1 is DC mode. The modes 2-34 are directional modes, among which mode 10 is horizontal mode, mode 26 is vertical mode, and mode 2, mode 18 and mode 34 are diagonal modes. In some examples, the intra prediction modes are signaled by three most probable modes (MPMs) and 32 remaining modes.

Figure 28:
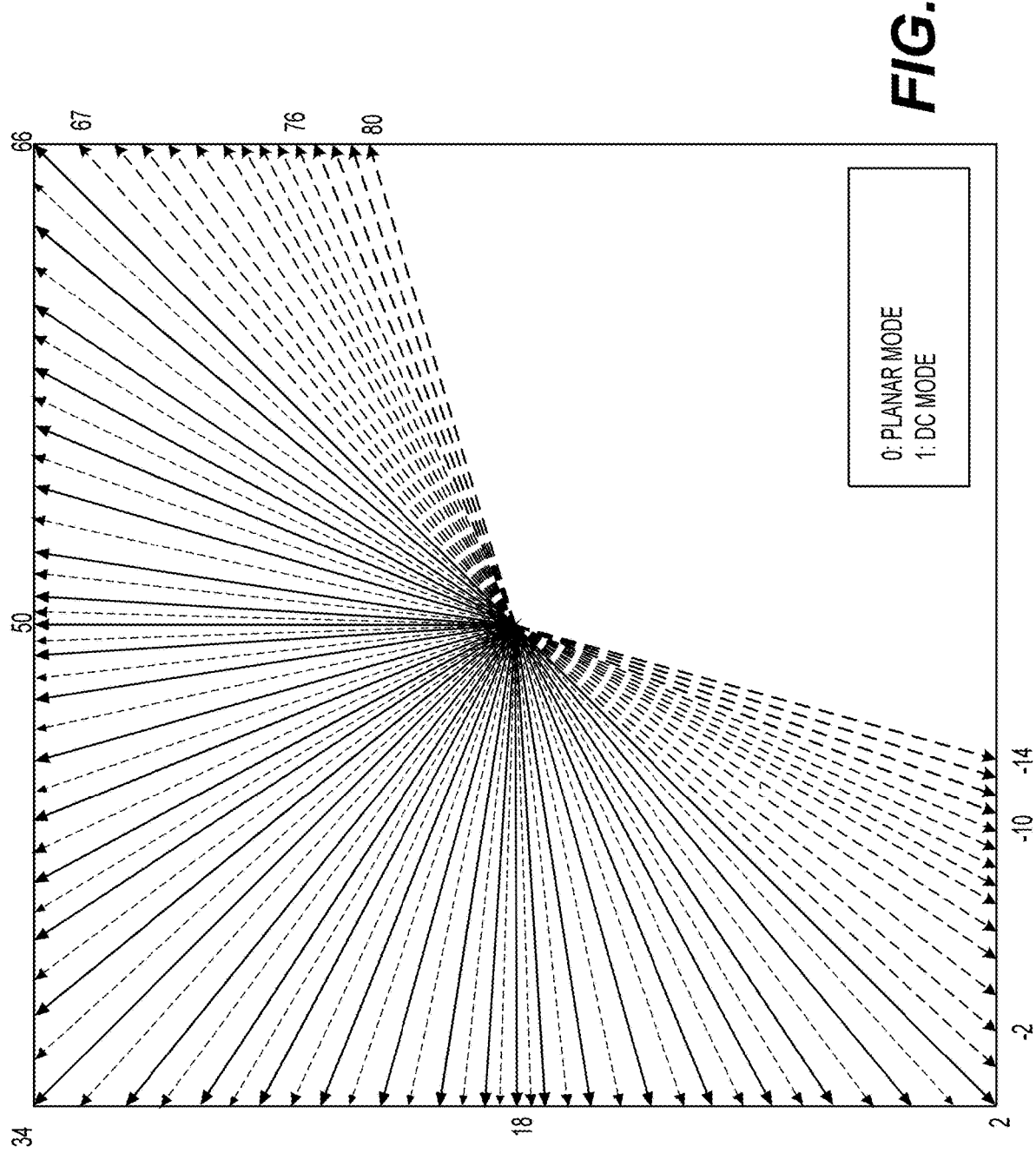
FIG. 28 shows an illustration of exemplary intra prediction directions and intra prediction modes in some examples.

FIG. 28 shows an illustration of exemplary intra prediction directions and intra prediction modes in some examples (e.g., VVC). There are total 95 intra prediction modes (mode −14 to mode 80), among which mode 18 is horizontal mode, mode 50 is vertical mode, and mode 2, mode 34 and mode 66 are diagonal modes. Modes −1~−14 and Modes 67~80 are called wide-angle intra prediction (WAIP) modes.

According to an aspect of the disclosure, to code an intra mode, a most probable mode (MPM) list is built to include a subset of the intra prediction modes. In some examples such as HEVC, an MPM list includes three most probable modes and is constructed based on intra prediction mode(s) of neighboring block(s) of a current block. The MPM list is also referred to as primary MPM list. In such an example, an MPM flag is signaled to indicate whether an intra prediction mode of the current block is from the MPM list. When the MPM flag indicates that the intra prediction mode of the current block is from the MPM list, an MPM list index is signaled to indicate one of the three most probable modes in the MPM list for the current block. However, when the MPM flag indicates that the intra prediction mode of the current block is not from the MPM list, a mode index is signaled to indicate one of the other intra modes that are not in the MPM list for the current block.

In some examples, an MPM list generation process is shown as follows.

```
If (leftIntraDir == aboveIntraDir && leftIntraDir > DC_IDX)
    MPM [0] = leftIntraDir;
    MPM [1] = ((leftIntraDir + offset) % mod) + 2;
    MPM [2] = ((leftIntraDir − 1) % mod) + 2;
Else if (leftIntraDir == aboveIntraDir)
    MPM [0] = PLANAR_IDX;
    MPM [1] = DC_IDX;
    MPM [2] = VER_IDX;
Else if (leftIntraDir != aboveIntraDir)
    MPM [0] = leftIntraDir;
    MPM [1] = aboveIntraDir;
    If (leftIntraDir > 0 && aboveIntraDir > 0)
        MPM [2] = PLANAR_IDX;
    Else
        MPM [2] = (leftIntraDir + aboveIntraDir) < 2 ? VER_IDX :
        DC_IDX;
```

In the MPM list generation process, leftIntraDir indicates an intra prediction mode of a left neighboring block of a current block, and aboveIntraDir indicates an intra prediction mode of an above neighboring block of the current block. If the left or above block is not available, leftIntraDir or aboveIntraDir can be set to DC_IDX. PLANAR_IDX, DC_IDX, and VER_IDX indicate mode indices of planar mode (e.g., mode 0), DC mode (e.g., mode 1), and vertical mode (e.g., mode 26), respectively. In addition, variables "offset" and "mod" are constant values, which are set to 29 and 32 respectively in an example. In such an example, when both the left neighboring block and the above neighboring block have a same directional mode, the first most probable mode is set to the same directional mode. The second and third most probable modes are chosen as two directional modes that are closest to the mode number of the first most probable mode. When both the left neighboring block and the above neighboring block have a same non-directional mode, the first, second, and third most probable modes are set to planar mode, DC mode, and vertical mode, respectively. When the left neighboring block and the above neighboring block have different intra prediction modes, the first and second most probable modes are set to the intra prediction modes of the left neighboring block and the above neighboring block respectively, and the third most probable mode is set to one of planar mode, DC mode, or vertical mode, according to which of these modes, in this order, is not a duplicate of one of the first two most probable modes.

In some examples, such as in VTM3, the size of MPM list is set equal to 6 for both the adjacent reference line (also referred to reference line 0) and non-adjacent reference lines (also referred to non-zero reference lines). In an example, the MPM list can be derived from the adjacent reference line and non-adjacent reference lines.

Figure 29:
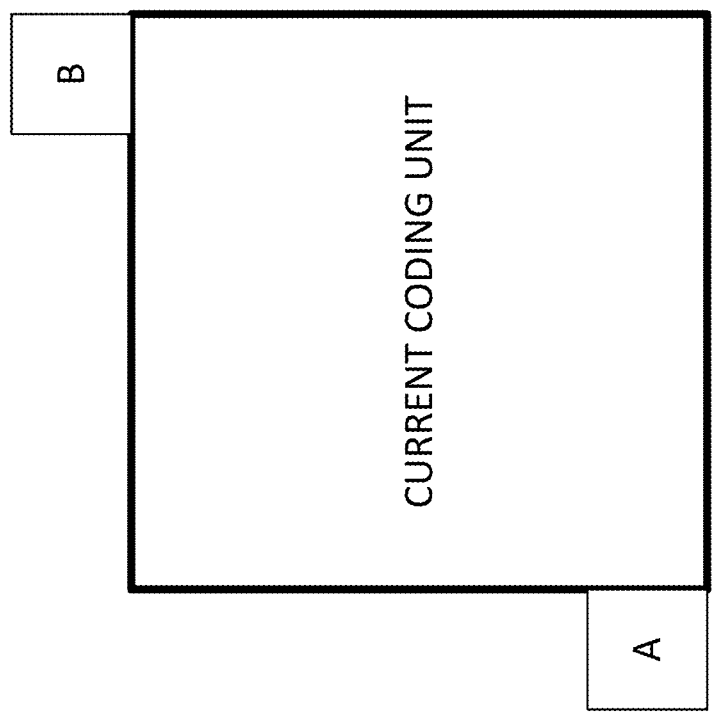
FIG. 29 shows an example of neighboring coding units for the current coding unit.

FIG. 29 shows an example of neighboring coding units for the current coding unit. As shown in FIG. 29, block A denote the left neighboring unit of the current coding unit and block B denote the above neighboring unit of the current coding unit.

In some embodiments, multi-line intra prediction can be applied to use more reference lines for intra prediction, and encoder decides and signals which reference line is used to generate the intra predictor. The reference line index is signaled before intra prediction modes, and only the most probable modes are allowed in case a nonzero reference line index is signaled.

Figure 30:
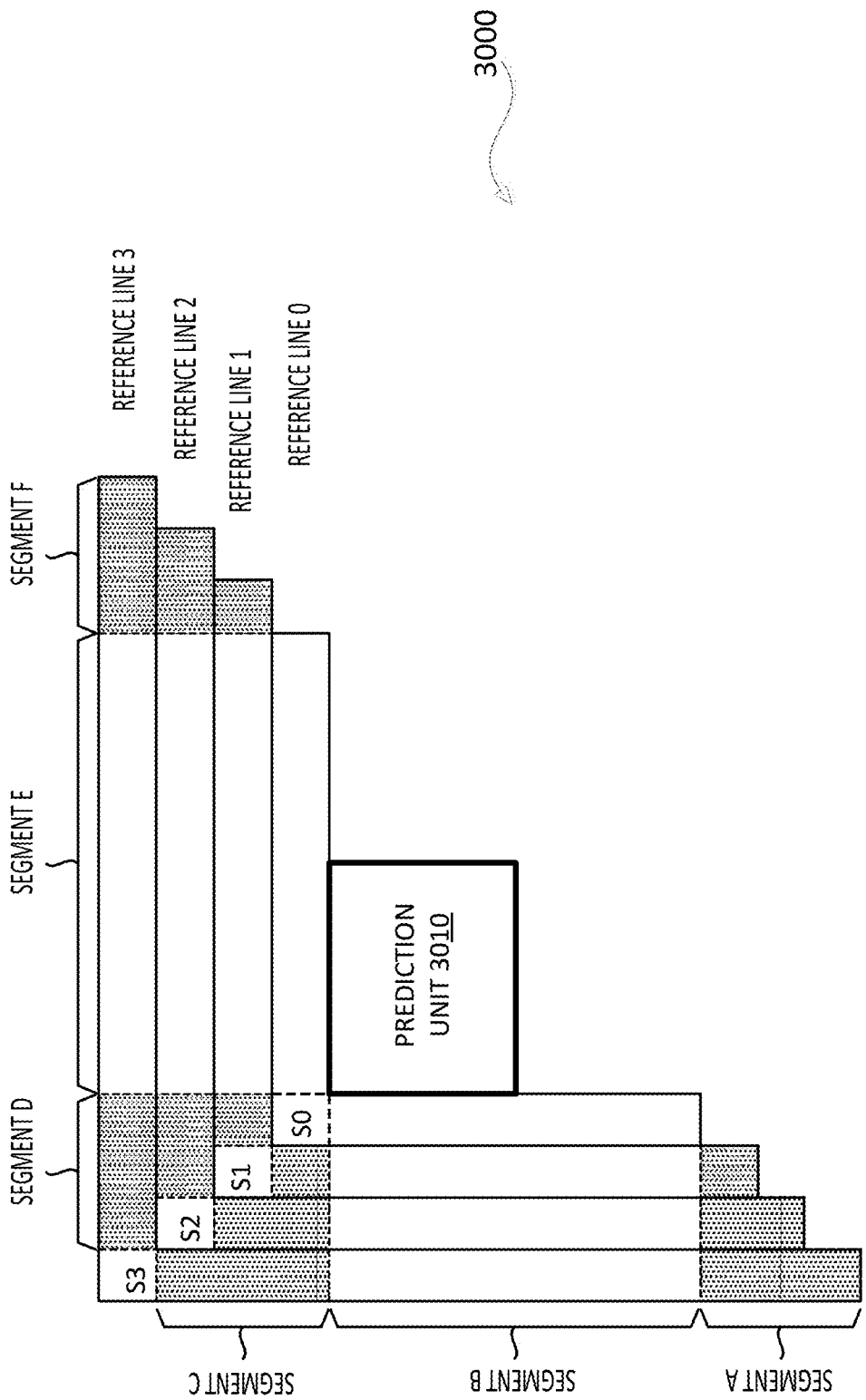
FIG. 30 shows an example of multiple reference lines.

FIG. 30 shows an example of multiple reference lines, such as four reference lines that are shown as reference line 0, reference line 1, reference line 2 and reference line 3. Each reference line is composed of six segments, i.e., Segment A to F, together with a top-left reference sample (shown as S0, S1, S2 and S3 respectively for the four reference lines). In addition, Segment A and F are padded with the closest samples from Segment B and E, respectively.

In some embodiment, the positions of neighboring modes used to derive 6 MPM candidates are also the same for adjacent and non-adjacent reference lines, which is illustrated in FIG. 29. In FIG. 29, the block A and block B denote the above and left neighboring coding unit of current coding unit. Variables candIntraPredModeA and candIntraPredModeB are used to indicate the associated intra prediction modes of block A and B respectively. In an example, candIntraPredModeA and candIntraPredModeB are initially set equal to INTRA_PLANAR. When block A (or B) is marked as available, candIntraPredModeA (or candIntraPredModeB) is then set equal to the actual intra prediction mode of block A (or B).

In some embodiments, MPM candidate derivation process is different for the adjacent and non-adjacent reference lines. For zero reference line (reference line 0), when both two neighboring modes are Planar or DC mode, default modes are used to construct the MPM list. For example, 2 of the 6 candidate modes in MPM list are Planar and DC modes, and the remaining 4 modes are angular modes (also referred to angular default modes). For non-zero reference lines, when both two neighboring modes are Planar or DC mode, 6 angular default modes are used to construct the MPM list. In an example, the MPM list derivation process is shown as follows, where candModeList[x] with x=0 . . . 5 denotes the 6 MPM candidates, IntraLumaRefLineIdx[xCb][yCb] denotes the reference line index of the block to be predicted, and IntraLumaRefLineIdx[xCb][yCb] can be 0, 1, or 3.

For example, when candIntraPredModeB is equal to candIntraPredModeA and candIntraPredModeA is greater than INTRA_DC, candModeList[x] with x=0 . . . 5 is derived based on IntraLumaRefLineIdx[xCb][yCb]. When IntraLumaRefLineIdx[xCb][yCb] is equal to 0, the candidate list is built according to (Eq. 3)-(Eq. 8):

$$candModeList[0]=candIntraPredModeA \quad (Eq. 3)$$

$$candModeList[1]=INTRA\_PLANAR \quad (Eq. 4)$$

$$candModeList[2]=INTRA\_DC \quad (Eq. 5)$$

$$candModeList[3]=2+((candIntraPredModeA+61)\%64) \quad (Eq. 6)$$

$$candModeList[4]=2+((candIntraPredModeA-1)\%64) \quad (Eq. 7)$$

$$candModeList[5]=2+(candIntraPredModeA+60)\%64) \quad (Eq. 8)$$

Otherwise, when IntraLumaRefLineIdx[xCb][yCb] is not equal to 0, the candidate list is built according to (Eq. 9)-(Eq. 14)

$$candModeList[0]=candIntraPredModeA \quad (Eq. 9)$$

$$candModeList[1]=2+((candIntraPredModeA+61)\%64) \quad (Eq. 10)$$

$$candModeList[2]=2+((candIntraPredModeA-1)\%64) \quad (Eq. 11)$$

$$candModeList[3]=2+((candIntraPredModeA+60)\%64) \quad (Eq. 12)$$

$$candModeList[4]=2+(candIntraPredModeA\%64) \quad (Eq. 13)$$

$$candModeList[5]=2+(candIntraPredModeA+59)\%64) \quad Eq.\ 14)$$

When candIntraPredModeB is not equal to candIntraPredModeA and candIntraPredModeA or candIntraPredModeB is greater than INTRA_DC, two variables min AB and max AB are derived according to (Eq. 15) and (Eq. 16)

$$min\ AB=candModeList[(candModeList[0]>candModeList[1])?1:0] \quad (Eq. 15)$$

$$max\ AB=candModeList[(candModeList[0]>candModeList[1])?0:1] \quad (Eq. 16)$$

Further, when candIntraPredModeA and candIntraPredModeB are both greater than INTRA_DC, candModeList[x] with x=0 . . . 1 can be derived according to (Eq. 17)-(Eq. 22):

$$candModeList[0]=candIntraPredModeA \quad (Eq. 17)$$

$$candModeList[1]=candIntraPredModeB \quad (Eq. 18)$$

Then, the other four candidate modes are set based on IntraLumaRefLineIdx[xCb][yCb]. For example, when IntraLumaRefLineIdx[xCb][yCb] is equal to 0, two candidate modes can be set as (Eq. 19) and (Eq. 20)

$$candModeList[2]=INTRA\_PLANAR \quad (Eq. 19)$$

$$candModeList[3]=INTRA\_DC \quad (Eq. 20)$$

When max AB−min AB is in the range of 2 to 62, inclusive, last two candidate modes can be set as (Eq. 21) and (Eq. 22)

$$candModeList[4]=2+((max\ AB+61)\%64) \quad (Eq. 21)$$

$$candModeList[5]=2+((max\ AB-1)\%64) \quad (Eq. 22)$$

When max AB−min AB is out of the range of 2 to 62, the last two candidate modes can be set as (Eq. 23) and (Eq. 24)

$$candModeList[4]=2+((max\ AB+60)\%64) \quad (Eq. 23)$$

$$candModeList[5]=2+((max\ AB)\%64) \quad (Eq. 24)$$

When IntraLumaRefLineIdx[xCb][yCb] is not equal to 0, the other four candidate modes are set based on the difference between max AB and min AB. When max AB−min AB is equal to 1, the four candidate modes can be set as (Eq. 25)-(Eq. 28)

$$candModeList[2]=2+((min\ AB+61)\%64) \quad (Eq. 25)$$

$$candModeList[3]=2+((max\ AB-1)\%64) \quad (Eq. 26)$$

$$candModeList[4]=2+((min\ AB+60)\%64) \quad (Eq. 27)$$

$$candModeList[5]=2+(max\ AB\ \%\ 64) \quad (Eq. 28)$$

When max AB−min AB is equal to 2, the four candidate modes can be set as (Eq. 29)-(Eq. 32):

$$candModeList[2]=2+((min\ AB-1)\%64) \quad (Eq. 29)$$

$$candModeList[3]=2+((min\ AB+61)\%64) \quad (Eq. 30)$$

$$candModeList[4]=2+((max\ AB-1)\%64) \quad (Eq. 31)$$

$$candModeList[5]=2+((min\ AB+60)\%64) \quad (Eq. 32)$$

When max AB−min AB is greater than 61, the four candidate modes can be set as (Eq. 33)-(Eq. 36):

$$candModeList[2]=2+((min\ AB-1)\%64) \quad (Eq. 33)$$

$$candModeList[3]=2+((max\ AB+61)\%64) \quad (Eq. 34)$$

$$candModeList[4]=2+(min\ AB\ \%\ 64) \quad (Eq. 35)$$

$$candModeList[5]=2+((max\ AB+60)\%64) \quad (Eq. 36)$$

When max AB−min AB is greater than 2 but lower than 61, the four candidate modes can be set as (Eq. 37)-(Eq. 40):

$$candModeList[2]=2+((min\ AB+61)\%64) \quad (Eq. 37)$$

$$candModeList[3]=2+((min\ AB-1)\%64) \quad (Eq. 38)$$

$$candModeList[4]=2+((max\ AB+61)\%64) \quad (Eq. 39)$$

$$candModeList[5]=2+((max\ AB-1)\%64) \quad (Eq. 40)$$

When one of candIntraPredModeA and candIntraPredModeB is greater than INTRA_DC), the candModeList[x] with x=0 . . . 5 can be derived based IntraLumaRefLineIdx[xCb][yCb]. For example, when IntraLumaRefLineIdx[xCb][yCb] is equal to 0, the 6 candidate modes can be derived according to (Eq. 41)-(Eq. 46)

$$candModeList[0]=candIntraPredModeA \quad (Eq. 41)$$

$$candModeList[1]=candIntraPredModeB \quad (Eq. 42)$$

$$candModeList[2]=1-min\ AB \quad (Eq. 43)$$

$$candModeList[3]=2+((max\ AB+61)\%64) \quad (Eq. 44)$$

$$candModeList[4]=2+((max\ AB-1)\%64) \quad (Eq. 45)$$

candModeList[5]=2+(max AB+60)%64) (Eq. 46)

However, when IntraLumaRefLineIdx[xCb][yCb] is not equal to 0), the 6 candidate modes can be derived according to (Eq. 47)-(Eq. 52):

candModeList[0]=max AB (Eq. 47)

candModeList[1]=2+((max AB+61)%64) (Eq. 48)

candModeList[2]=2+((max AB−1)%64) (Eq. 49)

candModeList[3]=2+((max AB+60)%64) (Eq. 50)

candModeList[4]=2+(max AB % 64) (Eq. 51)

candModeList[5]=2+(max AB+59)%64) (Eq. 52)

Otherwise, when both candIntraPredModeA and candIntraPredModeB are not greater than INTRA_DC, the candModeList[x] with x=0 . . . 5 can be derived based on IntraLumaRefLineIdx[xCb][yCb]. For example, when IntraLumaRefLineIdx[xCb][yCb] is equal to 0, the 6 candidate modes can be derived according to (Eq. 53)-(Eq. 58)

candModeList[0]=candIntraPredModeA (Eq. 53)

candModeList[1]=(candModeList[0]==INTRA_PLANAR)?INTRA_DC:INTRA_PLANAR (Eq. 54)

candModeList[2]=INTRA_ANGULAR50 (Eq. 55)

candModeList[3]=INTRA_ANGULAR18 (Eq. 56)

candModeList[4]=INTRA_ANGULAR46 (Eq. 57)

candModeList[5]=INTRA_ANGULAR54 (Eq. 58)

However, when IntraLumaRefLineIdx[xCb][yCb] is not equal to 0, the 6 candidate modes can be derived according to (Eq. 59)-(Eq. 64)

candModeList[0]=INTRA_ANGULAR50 (Eq. 59)

candModeList[1]=INTRA_ANGULAR18 (Eq. 60)

candModeList[2]=INTRA_ANGULAR2 (Eq. 61)

candModeList[3]=INTRA_ANGULAR34 (Eq. 62)

candModeList[4]=INTRA_ANGULAR66 (Eq. 63)

candModeList[5]=INTRA_ANGULAR26 (Eq. 64)

Figure 32:
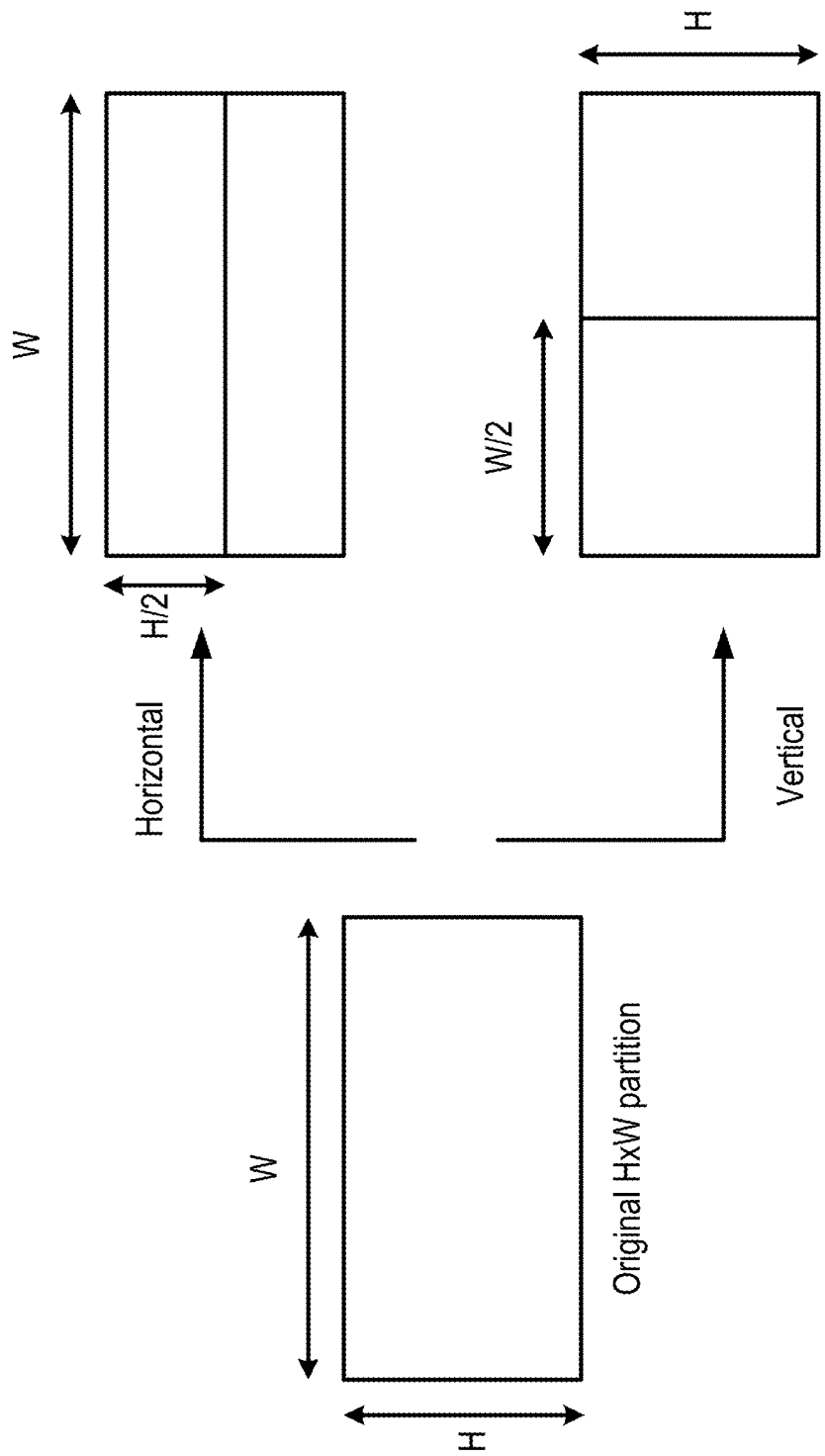
FIG. 32 shows the scenario where a block is partitioned into two sub-partitions.
Figure 33:
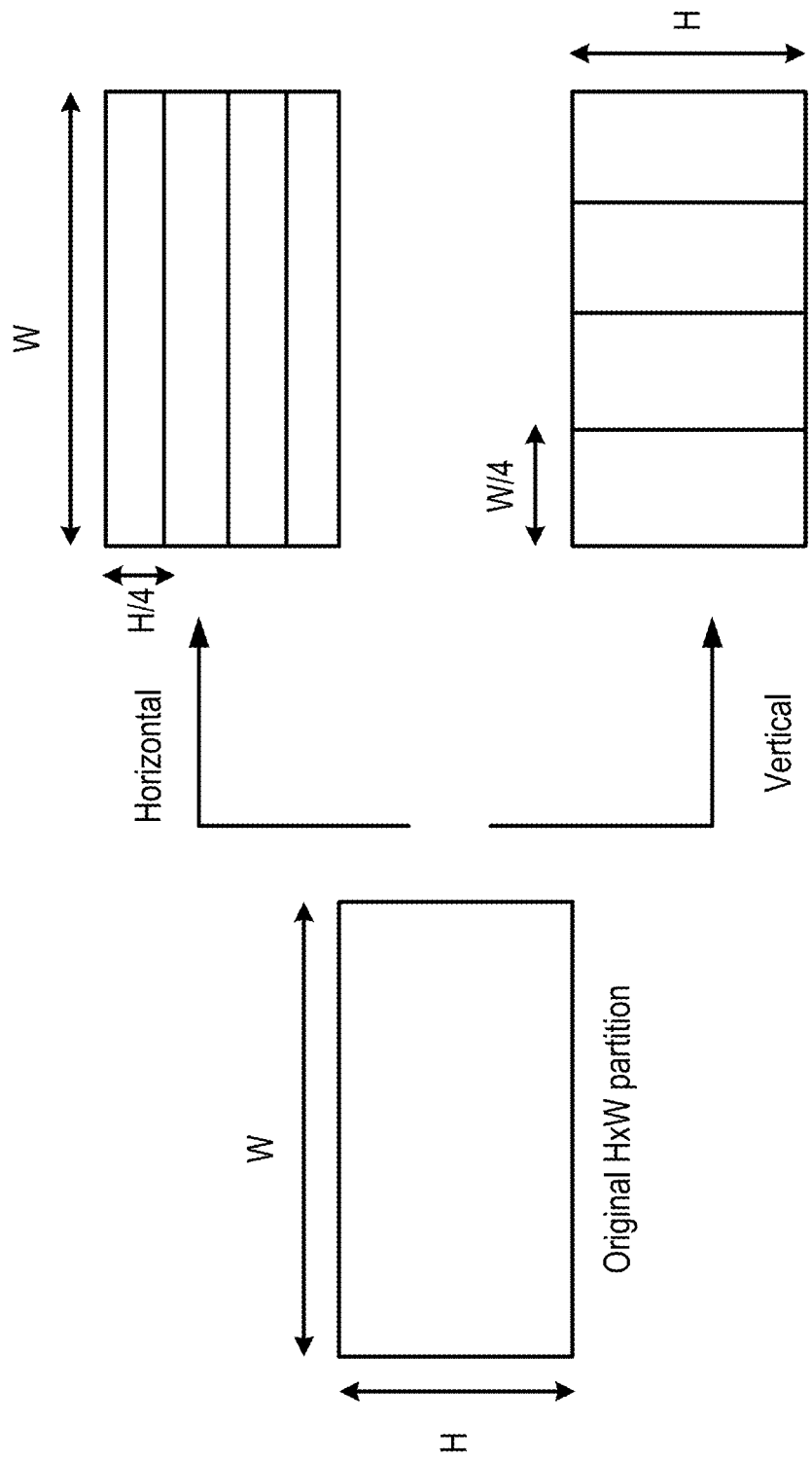
FIG. 33 shows the scenario where a block is partitioned into four sub-partitions.

In some embodiments, an intra sub-partition (ISP) coding mode is employed. In ISP coding mode, a luma intra-predicted block can be partitioned vertically or horizontally into 2 or 4 sub-partitions. The number of sub-partitions can depend on a size of the block. FIG. 31 shows the number of sub-partitions depending on the block size. FIG. 32 shows the scenario where a block is partitioned into two sub-partitions. FIG. 33 shows the scenario where a block is partitioned into four sub-partitions. In an example, all sub-partitions fulfill a condition of having at least 16 samples. In an example, ISP is not applied to chroma components.

In an example, for each of sub-partitions partitioned from a coding block, a residual signal is generated by entropy decoding respective coefficients sent from an encoder and then inverse quantizing and inverse transforming them. Then, a first one of the sub-partitions is intra predicted to generate a prediction signal. The prediction signal is added to the respective residual signal of the first sub-partition to obtain corresponding reconstructed samples. Thereafter, the reconstructed sample values of the first sub-partition can be available to generate a prediction of a second one of the sub-partitions. This process can be repeated sub-partition by sub-partition, until all sub-partitions from the coding block are reconstructed. In an example, all the sub-partitions share a same intra mode.

In an embodiment, the ISP coding mode is only tested with intra modes that are part of a most probable mode (MPM) list. Accordingly, if a block uses ISP, then a MPM flag can be inferred to be one. In addition, when ISP is used for a certain block, then a respective MPM list will be modified to exclude DC mode and to prioritize horizontal intra modes for the ISP horizontal split and vertical intra modes for the vertical one.

In ISP coding mode, each sub-partition can be regarded as a sub-TU, since the transform and reconstruction is performed individually for each sub-partition.

It is noted that the disclosed techniques can be used for NSST and other suitable non-separable secondary transform, such as reduced secondary transform (RST) which is an alternative design of non-separable secondary transform. RST is a variant of NSST and uses transform zero-out scheme. RST checks whether the intra prediction mode is planar or DC for entropy coding the transform index of NSST.

In an example (e.g., in JVET-N0193), 4 transform sets are applied, and each transform set includes three RST transform cores, which can be either size 16×48 (or 16×64) (applied for transform coefficient block with height and width both being greater than or equal to 8) or 16×16 (applied for transform coefficient block with either height or width being equal to 4). For notational convenience, the 16×48 (or 16×64) transform is denoted as RST8×8 and the 16×16 transform is denoted as RST4×4.

Figure 34:
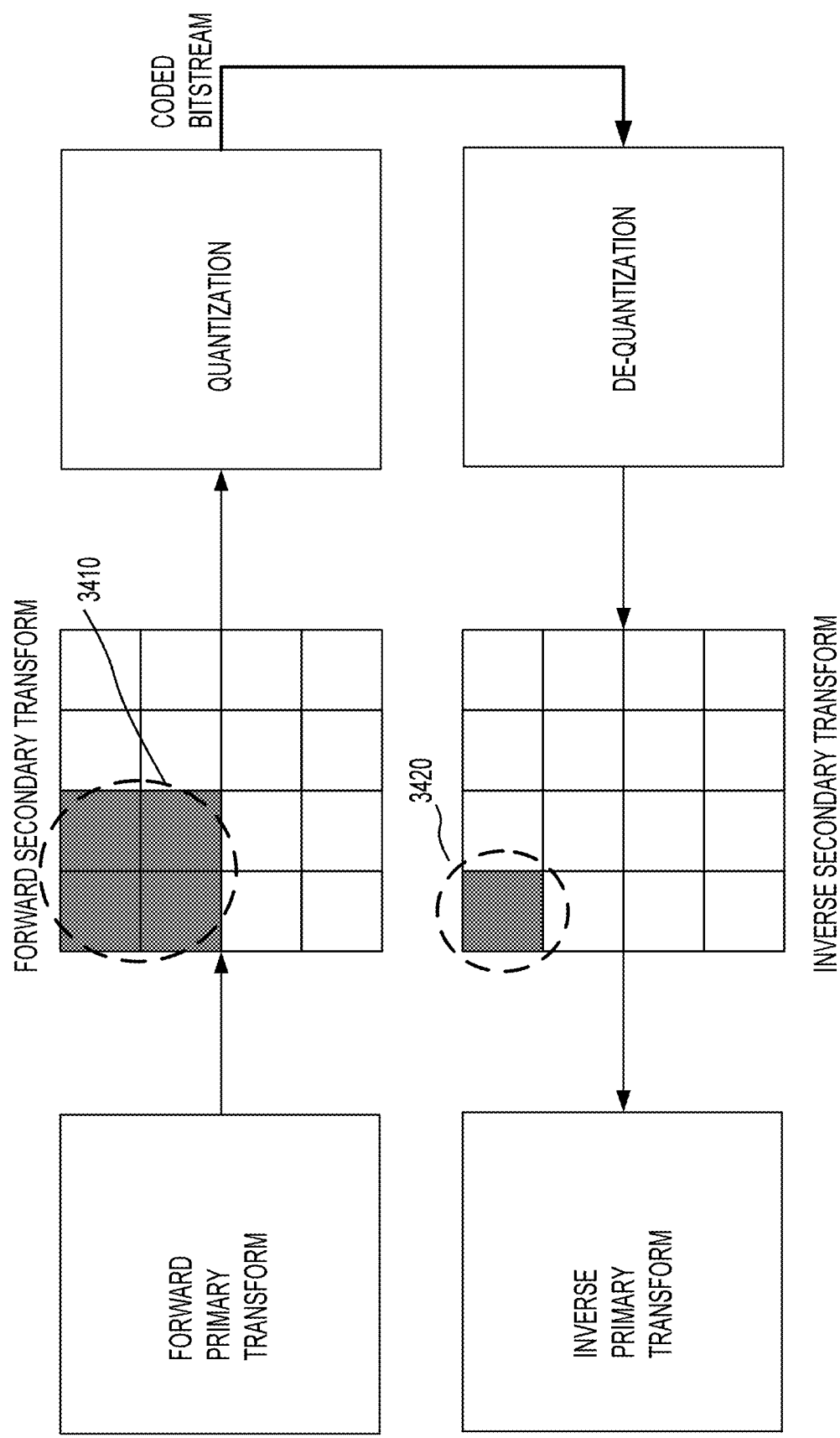
FIG. 34 shows an example using a transform core according to an embodiment of the disclosure.

FIG. 34 shows an example using a 16×64 transform core according to an embodiment of the disclosure. For example, at the encoder side, 16×64 transform is applied to the portion (3410) which is the top left 8×8 region of the transform coefficients block, and the results are 16 coefficients. Thus, at the decoder side, the inverse RST is applied on the portion (3420) which includes 16 coefficients at the top left 4×4 region.

Figure 35:
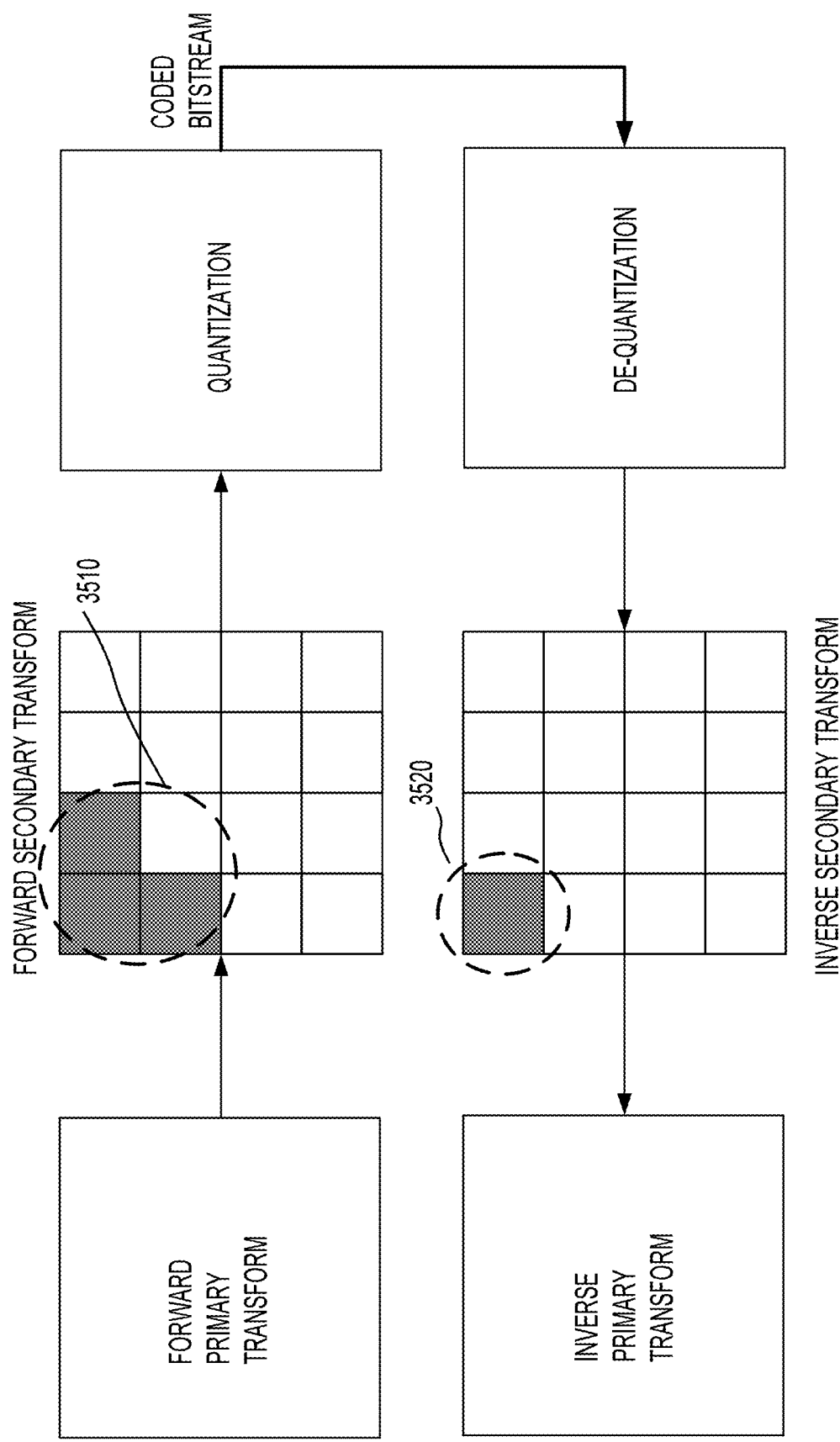
FIG. 35 shows an example using another transform core according to an embodiment of the disclosure.

FIG. 35 shows an example using 16×48 transform core according to an embodiment of the disclosure. For example, at the encoder side, 16×48 transform is applied to the portion (3510) which is the top left grey region that includes 3 of 4×4 blocks of the transform coefficients block, and the results are 16 coefficients. Thus, at the decoder side, the inverse RST is applied on the portion (3520) which includes 16 coefficients at the top left 4×4 region.

Generally, the main idea of a reduced transform (RT) is to map an N dimensional vector to an R dimensional vector in a different space, where R/N (R<N) is the reduction factor.

FIG. 36 shows a RST matrix that is an R×N matrix. The RST matrix includes R rows of the transform that are R bases of the N dimensional space. The inverse transform matrix for RT is the transpose of the forward transform.

For example, the RST8×8 with a reduction factor of 4 (¼ size) can be applied. For conventional 8×8 non-separable transform matrix size, 64×64 transform matrix needs to be applied. For the reduced transform RST8×8, 16×64 direct matrix is used. In other words, the 64×16 inverse RST matrix is used at the decoder side to generate core (primary) transform coefficients in 8×8 top-left regions. The forward RST8×8 uses 16×64 (or 8×64 for 8×8 block) matrices so that the reduced transform produces non-zero coefficients only in the top-left 4×4 region within the given 8×8 region. In other words, when RST is applied then the 8×8 region except the top-left 4×4 region will have only zero coefficients. For RST4×4, 16×16 (or 8×16 for 4×4 block) direct matrix multiplication is applied.

In some embodiments, such as for RST8×8, to further reduce the transform matrix size, instead of the using the whole top-left 8×8 coefficients as input for calculating secondary transform, the top-left three 4×4 coefficients are used as the input for calculating secondary transform.

Figure 37B:
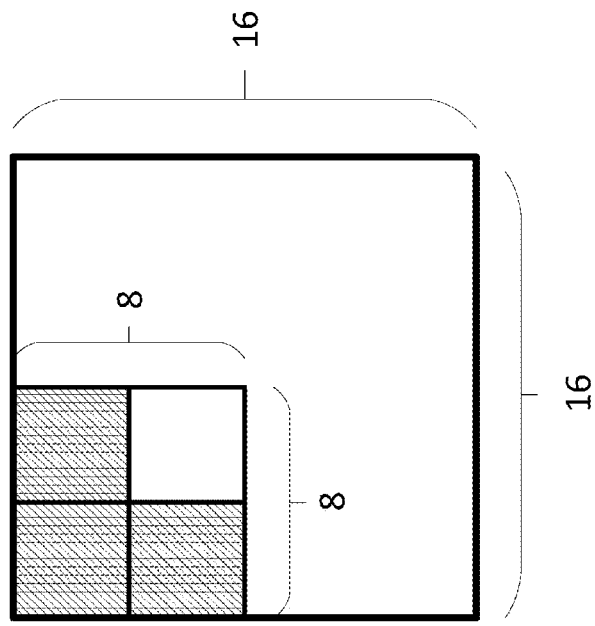
FIGS. 37A-37B illustrate reduced secondary transform according to some aspects of the disclosure.
Figure 37A:
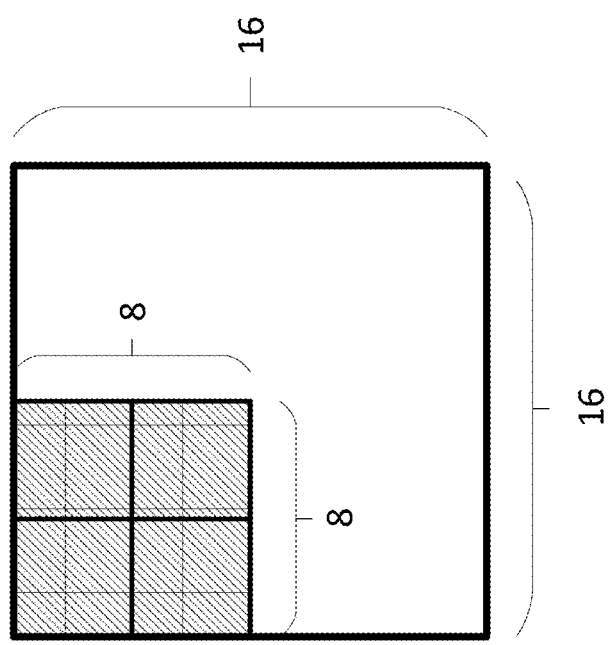

FIG. 37A shows an 16×16 block (e.g., coefficients block after primary transform). In an example, RST8×8 can be applied to the top left 8×8 region (in diagonal stripes) using 16×64 transform matrices.

FIG. 37B shows an 16×16 block (e.g., coefficients block after primary transform). In an example, RST8×8 can be applied to the top left region in diagonal stripes using 16×48 transform matrices.

In some embodiments, an inverse RST is conditionally applied when certain conditions are satisfied, such as a first condition that requires that the block size is greater than or equal to the given threshold (e.g., W>=4 && H>=4) and a second condition that requires that transform skip mode flag is equal to zero.

In some examples, when both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

In some embodiments, RST index is used. When the RST index is equal to 0, RST is not applied. When the RST index is not zero, RST is applied, and the kernel is chosen based on the RST index.

In some embodiments, RST is applied for intra CU in both intra and inter slices, and for both luma and chroma. In an example, when a dual tree is enabled, RST indices for luma and chroma are signaled separately. For inter slice (the dual tree is disabled), a single RST index is signaled and used for both luma and chroma. When ISP mode is selected, RST is disabled, and RST index is not signaled.

In some embodiments, an RST matrix is chosen from four transform sets, and each set includes two transforms. The chosen of the transform set is determined based on intra prediction mode.

When one of three cross component linear model (CCLM) modes is indicated, transform set 0 is selected. Otherwise, transform set selection is performed according to a table.

FIG. 38 shows a table that is used for transform set selection. In the FIG. 38 example, IntraPredMode has a range of [−14, 83] and is used for wide angle intra prediction. The corresponding transform mode index to the InPredMode is the transformed mode index used for wide angle intra prediction.

Using the RST design adopted in VVC Draft v5 as an example, the RST utilizes 4×2 16×16 transform matrices (RST4×4) and 4×2 16×48 transform matrices (RST8×8), and each element in the transform matrix is represented using 8-bit integers. Thus, a total of 4×2×(256+768)=8 K bytes memory is used for storing the transform matrices.

Different implementations can be implemented in other standard. For example, in JVET-O0292 and JVET-O0350, instead of two candidates, only one candidate can be used and signaled for each block. The technique of using one candidate, as used in JVET-O0292 and JVET-O0350, is referred to as low-frequency non-separable secondary transform (LFNST).

FIG. 39 shows a table for determining LFSNT index (lfnstIdx in the table). In the FIG. 39 example, the LFSNT index that is signaled in the bitstream is denoted as lfnstIdx, the selected LFNST core index in the given transform set is denoted as coreIdx, and intra prediction mode is denoted as intraMode.

In some examples, such as used in JVET-O0292 and JVET-O0350, only one LFNST candidate remains but the scheme still support selecting all the LFNST candidates defined in current VVC Draft 6. Since only one LFNST candidate is kept, the burden of selecting LFNST at the encoder is reduced.

Further, if the encoder drops lfnstIdx 2 to achieve the encoder speedup, there is a significant coding loss since the second LFNST candidate can never be chosen.

According to some aspects of the disclosure, the bottleneck of the hardware processing may be the 4×4 intra prediction. Adding LFNST for 4×4 TU can make the hardware processing worse. However, LFNST for 4×4 TU may not contribute good coding gain.

According to some aspects of the disclosure, NSST is mostly helpful for video content with directional texture patterns. For non-angular intra prediction mode, such as Planar or DC, the coding gain of NSST is relatively lower. Thus, the present disclosure provide context modeling techniques for entropy coding of secondary transform index or flag.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

In some examples, DST-7 is used as an MTS candidate, and DST-4 can be used as MTS candidate in the place of DST-7. In some examples, DCT-8 is used as an MTS candidate, and DCT-4 can be used as MTS candidate in the place of DCT-8.

It is noted that the disclosed techniques can be used for NSST and other suitable non-separable secondary transform, such as reduced secondary transform (RST) which is an alternative design of non-separable secondary transform (e.g. as described in JVET-M0292 or JVET-N0193), or low-frequency non-separable secondary transform (LFNST) (e.g., adopted in VVC Draft v6)

It is noted that, in the present disclosure, TB refers to the transform coefficient block of one color component, and TU may include multiple TBs with same coordinate and size. Further, when the block size (e.g., CU size, or TU size, or PU size, or TB size) is smaller than or equal to a threshold, the block size limitations may refer to one of or more interpretations. The interpretations include (1) both the block width and block height are smaller than a or equal to threshold; (2) the block area size (number of samples) is smaller than a or equal to threshold; (3) the minimum between block width and block height is smaller than or equal to a threshold; (4) the maximum between block width and block height is smaller than or equal to a threshold; (5) block width is smaller than a or equal to threshold; (6) block height is smaller than a or equal to threshold; (7) block aspect ratio (width vs height, or height vs width) is smaller than (or greater than) a or equal to threshold.

According to some aspects of the disclosure, the context derivation or binarization of entropy coding NSST index or NSST flag can be performed based on bits that are indicative of potential usage of directional patterns for a block, such as angular intra prediction mode, to improve coding efficiency. Thus, at the decoder side, in some embodiments, when the bits there are indicative of potential usage of directional patterns are parsed from the bitstream, and before the angular intra prediction mode is fully decoded, the bits can be used to provide context for entropy coding of the NSST index or NSST flag.

In some embodiments, the context derivation or binarization of entropy coding NSST index or NSST flag depends on the MPM flag, and/or MPM index. For example, when MPM flag is true, the possibility of using angular intra prediction modes is less than the case when the MPM flag is false.

In an embodiment, the context used for entropy coding NSST index or NSST flag is derived based on the first bin of MPM index. In some examples, truncated unary binarization can be used to binarize the MPM index. For example, index 0 (first in MPM list) can be encoded using a first bin (first binary) of MPM index; index 1 (second in MPM list) can be coded using a first bin and a second bin. Some techniques to form the MPM list have tendency to put the DC and/or planar modes at the first and/or second positions in the MPM list. Thus, the first bin and/or the second bin of the MPM index can provide context for coding the secondary transform. Thus, in an example, the context used for entropy coding NSST index or NSST flag is derived based on the first bin and/or the second bin of MPM index.

According to another aspect of the disclosure, the context derivation or binarization for entropy coding NSST index and/or NSST flag depends on the reference line index. In some examples, nonzero reference line has a tendency to provide angular intra prediction mode. Thus, the reference line index can provide context for the entropy coding of information for the secondary transform.

In an example, the context used for entropy coding NSST index or NSST flag is derived based on the first bin of reference line index.

In another example, the context used for entropy coding NSST index or NSST flag is derived based on the second bin of reference line index.

In another example, the context used for entropy coding NSST index or NSST flag is derived based on the first bin and/or the second bin of reference line index.

According to an aspects of the disclosure, the context derivation or binarization for entropy coding NSST index and/or NSST flag depends on the ISP partitioning index (whether horizontal or whether vertical partitioning, whether horizontal or vertical partitioning). Thus, the ISP partitioning index can provide context for the entropy coding of information for the secondary transform.

In an example, the context used for entropy coding NSST index or NSST flag is derived based on the first bin of ISP partitioning index.

In another embodiment, the context used for entropy coding NSST index or NSST flag is derived based on the second bin of ISP partitioning index.

In another embodiment, the context used for entropy coding NSST index or NSST flag is derived based on the first bin and/or the second bin of ISP partitioning index.

In some embodiments, for intra mode coding, a flag (denoted as intra_ang_flag) indicating whether angular mode is applied or not is signaled. When the angular mode is not used, another flag (denoted as intra_planar_flag) indicating whether Planar or DC is applied or not is signaled. Then, the flags, such as intra_ang_flag and/or intra_planar_flag can provide context for entropy coding the information of secondary transform. Thus, the context derivation or binarization of entropy coding NSST index or NSST flag can depend on the flags.

In an example, the context used for entropy coding NSST index or NSST flag is derived based on only intra_planar_flag.

In another embodiment, the context used for entropy coding NSST index or NSST flag is derived based on only intra_ang_flag.

In another embodiment, the context used for entropy coding NSST index or NSST flag is derived based on both intra_ang_flag and intra_planar_flag.

According to some aspects of the disclosure, secondary transform, such as LFNST, can be disabled for TU sizes smaller than a certain threshold.

In some embodiments, LFNST is disabled for 4×4 TU size. In an embodiment, LFNST is disabled for 4×4 luma TU. In another embodiment, LFNST is disabled for 4×4 chroma TU. In another embodiment, LFNST is disabled for both 4×4 luma TU and 4×4 chroma TU.

In some embodiments, LFNST is disabled for 4×4, 4×8 and 8×4 TU sizes. In an embodiment, LFNST is disabled for 4×4, 4×8 and 8×4 luma TU. In another embodiment, LFNST is disabled for 4×4, 4×8 and 8×4 chroma TU. In another embodiment, LFNST is disabled for both 4×4, 4×8 and 8×4 luma TU and 4×4, 4×8 and 8×4 chroma TU.

In some embodiments, one LFNST index is signaled for use by multiple color components (for example, one LFNST index is signaled for Y, Cb and Cr). For each one of the color components, when the associated TB size is smaller than or equal to a given threshold, the associated coefficients of this TB do not have impact on the LFNST index signaling. In other words, the LFNST index signaling does not consider the coefficients (e.g., whether DC coefficient is nonzero, the last position value) of any TB with size being smaller than or equal to a given threshold.

In some embodiments, one LFNST index is signaled for use by multiple color components (for example, one LFNST index is signaled for Y, Cb and Cr). For each one of the color components, when the associated TB size is smaller than or equal to a given threshold such that this TB cannot apply LFNST, the LFNST index signaling still consider the coefficients (e.g., whether DC coefficient is nonzero, the last position value) of this TB of which the size is smaller than or equal to a given threshold. It is noted that the threshold value can be 4 or 8 in some examples.

Figure 40:
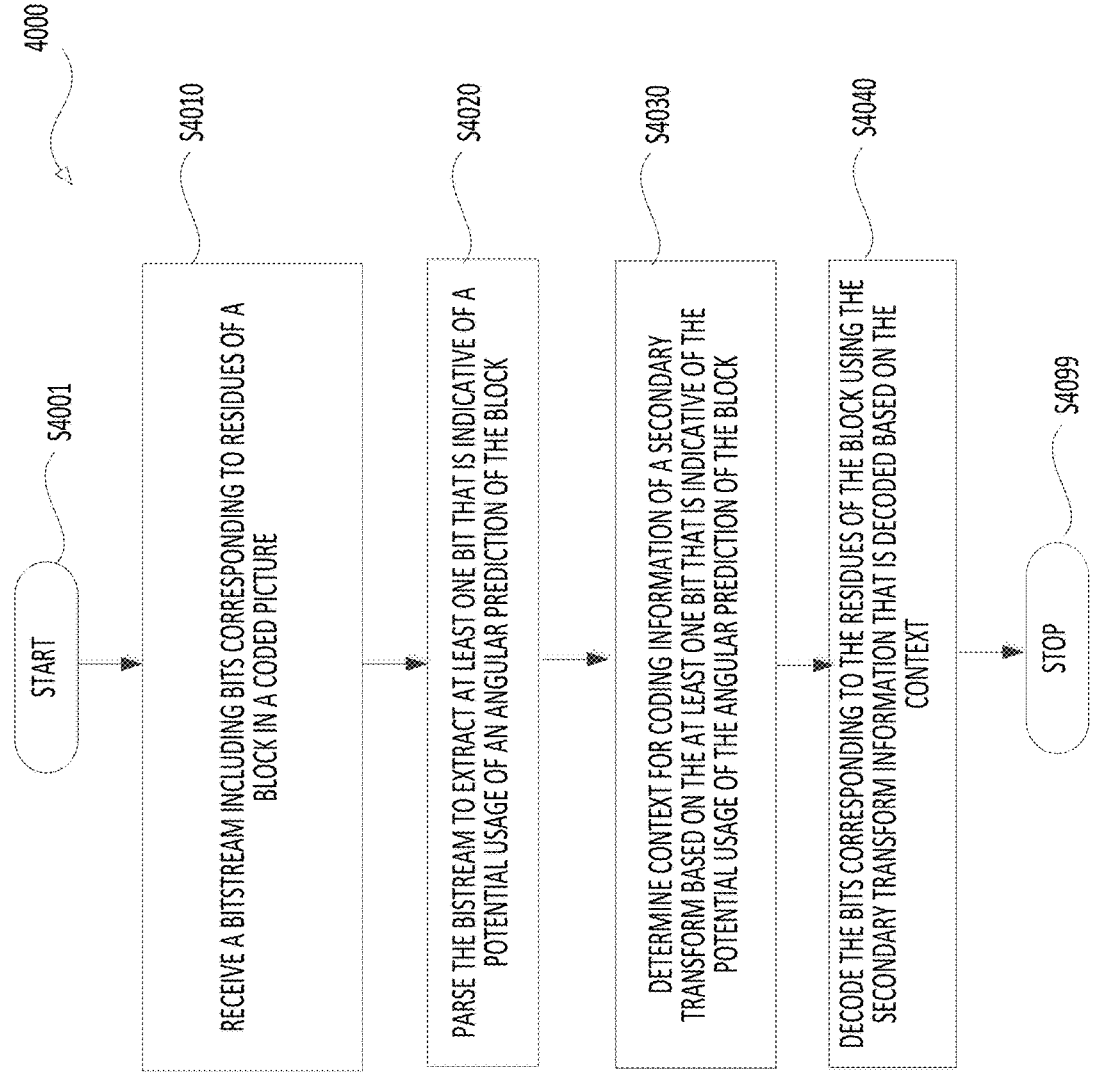
FIG. 40 is a flow chat outlining a process example according to some embodiments of the disclosure.

FIG. 40 shows a flow chart outlining a process (4000) according to an embodiment of the disclosure. The process (4000) can be used in the reconstruction of a block, so to generate a prediction block for the block under reconstruction. In various embodiments, the process (4000) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (4000) is implemented in software instructions, thus when the processing circuitry executes the software instructions, the processing circuitry performs the process (4000). The process starts at (S4001) and proceeds to (S4010).

At (S4010), a bitstream is received. The bitstream includes bits corresponding to residues of a block in a coded picture. For example, at an encoder, residues of a prediction block to the original block are calculated and transform is applied to the residues to generate coefficients. The coefficients are entropy coded into bits, thus the bits correspond to the residues of the block. The bits are included into the bitstream at the encoder side.

At (S4020), the bitstream is parsed to extract at least one bit that is indicative of a potential usage of an angular prediction of the block. In an example, when the bit is "1", using angular prediction has a higher probability than using non-angular prediction for the block; and when the bit is "0", using angular prediction has a lower probability than using non-angular prediction for the block. In an example, MPM flag or bins of the MPM index are extracted. In another example, reference line index is extracted. In another example, ISP partitioning index is extracted. In another example, a flag that is indicative of an application of an angular mode is extracted. In another example, a flag that is indicative of whether to apply planar or DC mode is extracted.

At (S4030), a context for coding information of a secondary transform is determined based on the at least one bit that is indicative of the potential usage of the angular prediction of the block. In some embodiments, a secondary transform, such as NSST, is applied to video content with directional texture patterns, such as with angular intra prediction modes. The binarization of entropy coding for information of NSST, such as the NSST flag, NSST index, and the like are based on context models that can be derived from the bits that are indicative of the potential usage of the angular prediction of the block.

At (S4040), the bits corresponding to the residues of the block using the secondary transform information that is decoded based on the context. The residues can be determined. For example, the secondary transform information can be decoded based on the context, and the secondary inverse transform can be performed based on the secondary transform information. Further, primary inverse transform can be performed to calculate the residues. The residues can be added with prediction to reconstruct the block. The process proceeds to (S4099) and terminates.

The techniques described above, can be implemented as computer software using computer-readable instructions and physically stored in one or more computer-readable media. For example, FIG. 41 shows a computer system (4100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 41:
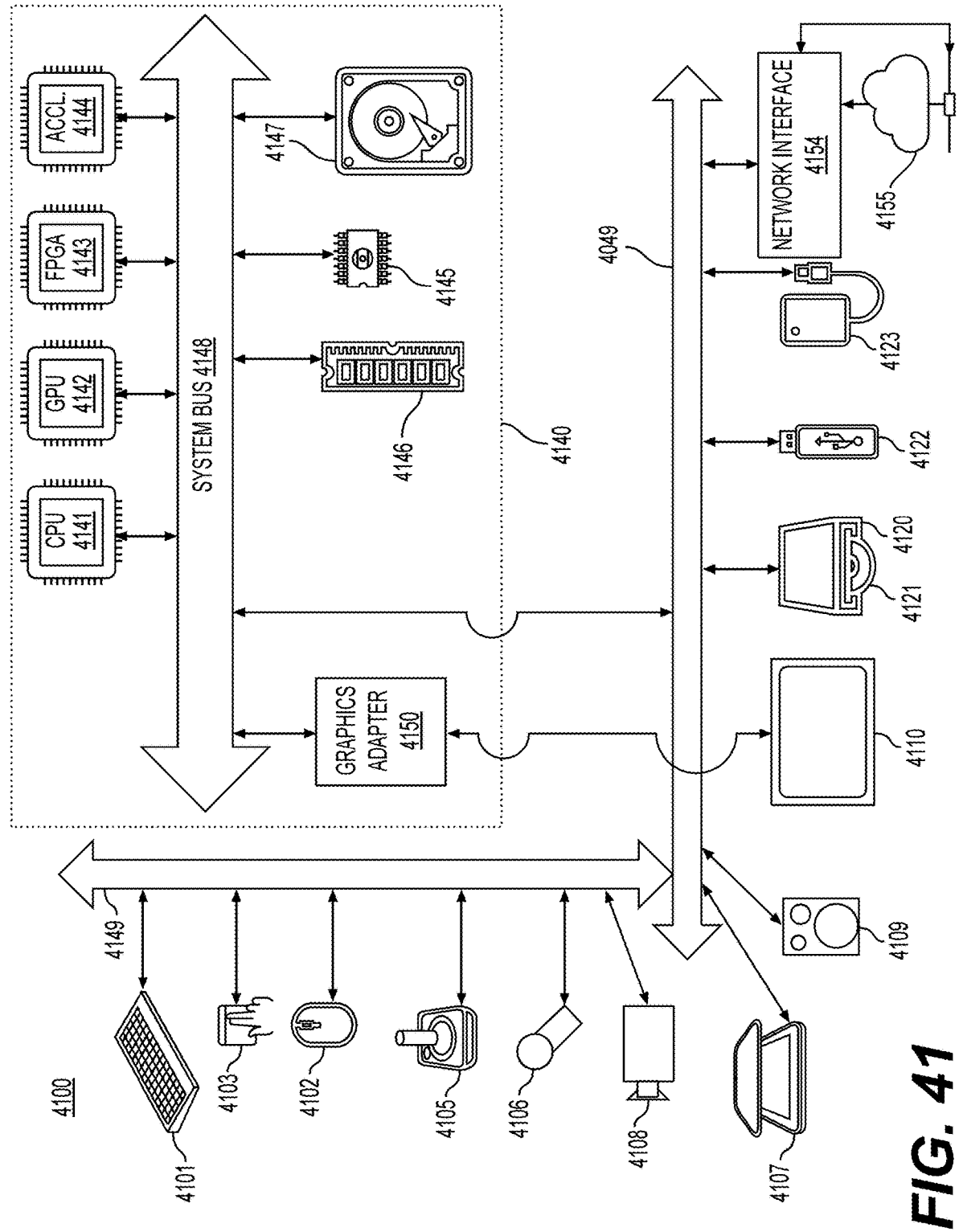
FIG. 41 is a schematic illustration of a computer system in accordance with an embodiment.

The components shown in FIG. 41 for computer system (4100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (4100).

Computer system (4100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (4101), mouse (4102), trackpad (4103), touch screen (4110), data-glove (not shown), joystick (4105), microphone (4106), scanner (4107), camera (4108).

Computer system (4100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (4110), data-glove (not shown), or joystick (4105), but there can also be tactile feedback devices that do not serve as input devices), audio output devices (such as: speakers (4109), headphones (not depicted)), visual output devices (such as screens (4110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (4100) can also include human accessible storage devices and their associated media such as optical media including CD/DVD ROM/RW (4120) with CD/DVD or the like media (4121), thumb-drive (4122), removable hard drive or solid state drive (4123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (4100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (4149) (such as, for example USB ports of the computer system (4100)); others are commonly integrated into the core of the computer system (4100) by attachment to a system bus as described below (for example Ethernet interface into a PC computer system or cellular network interface into a smartphone computer system). Using any of these networks, computer system (4100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (4140) of the computer system (4100).

The core (4140) can include one or more Central Processing Units (CPU) (4141), Graphics Processing Units (GPU) (4142), specialized programmable processing units in the form of Field Programmable Gate Areas (FPGA) (4143), hardware accelerators for certain tasks (4144), and so forth. These devices, along with Read-only memory (ROM) (4145), Random-access memory (4146), internal mass storage such as internal non-user accessible hard drives, SSDs, and the like (4147), may be connected through a system bus (4148). In some computer systems, the system bus (4148) can be accessible in the form of one or more physical plugs to enable extensions by additional CPUs, GPU, and the like. The peripheral devices can be attached either directly to the core's system bus (4148), or through a peripheral bus (4149). Architectures for a peripheral bus include PCI, USB, and the like.

CPUs (4141), GPUs (4142), FPGAs (4143), and accelerators (4144) can execute certain instructions that, in combination, can make up the aforementioned computer code. That computer code can be stored in ROM (4145) or RAM (4146). Transitional data can be also be stored in RAM (4146), whereas permanent data can be stored for example, in the internal mass storage (4147). Fast storage and retrieve to any of the memory devices can be enabled through the use of cache memory, that can be closely associated with one or more CPU (4141), GPU (4142), mass storage (4147), ROM (4145), RAM (4146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (4100), and specifically the core (4140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (4140) that are of non-transitory nature, such as core-internal mass storage (4147) or ROM (4145). The software implementing various embodiments of the present disclosure can be stored in such devices and executed by core (4140). A computer-readable medium can include one or more memory devices or chips, according to particular needs. The software can cause the core (4140) and specifically the processors therein (including CPU, GPU, FPGA, and the like) to execute particular processes or particular parts of particular processes described herein, including defining data structures stored in RAM (4146) and modifying such data structures according to the processes defined by the software. In addition or as an alternative, the computer system can provide functionality as a result of logic hardwired or otherwise embodied in a circuit (for example: accelerator (4144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
   receiving, by a processor, a bitstream including bits corresponding to residues of a block in a coded picture;
   parsing, by the processor, the bitstream to extract at least one bit from a set of bits corresponding to an angular prediction mode, the at least one bit being indicative of a likelihood that the block is encoded in accordance with the angular prediction mode and including (i) a first flag indicating whether the angular prediction mode is applied for prediction of the block, and (ii) a second flag indicating whether a planar mode or a DC mode is applied for prediction of the block when the first flag indicates no angular mode is applied for the prediction of the block;

determining, by the processor before the set of bits corresponding to the angular prediction mode is fully decoded, a context for coding information of a secondary transform based on the first flag and the second flag of the at least one bit that is indicative of the likelihood that the block is encoded in accordance with the angular prediction mode; and decoding, by the processor, the bits corresponding to the residues of the block using the coding information of the secondary transform that is decoded based on the context.

2. The method of claim 1,
wherein the at least one bit being indicative of the likelihood that the block is encoded in accordance with the angular prediction mode includes at least one of a flag for a most probable mode (MPM) and an index for the MPM.

3. The method of claim 1, wherein the determining the context for coding information of the secondary transform further includes:

determining, by the processor, the context for coding at least one of a flag for the secondary transform and an index for the secondary transform based on the at least one bit that is indicative of the likelihood that the block is encoded in accordance with the angular prediction mode.

4. The method of claim 1,
wherein the at least one bit that is indicative of the likelihood that the block is encoded in accordance with the angular prediction mode includes an index for a most probable mode (MPM), and
wherein the determining the context for coding the information for the secondary transform is based on at least one of a first bin and a second bin of the index for the MPM.

5. The method of claim 1,
wherein the at least one bit that is indicative of the likelihood that the block is encoded in accordance with the angular prediction mode includes an index for a reference line of the block, and
wherein the determining the context for coding the information for the secondary transform is based on at least one of a first bin and a second bin of the index for the reference line of the block.

6. The method of claim 1, wherein the at least one bit being indicative of the likelihood that the block is encoded in accordance with the angular prediction mode includes an index for an intra sub-partition of the block, and
wherein the determining the context for coding the information for the secondary transform is based on at least one of a first bin and a second bin of the index for the intra sub-partition of the block.

7. The method of claim 1, further comprising:
disabling, by the processor, the secondary transform when a size of the block is smaller than a threshold.

8. An apparatus for video decoding, comprising:
processing circuitry configured to:
receive a bitstream including bits corresponding to residues of a block in a coded picture;
parse the bitstream to extract at least one bit from a set of bits corresponding to an angular prediction mode, the at least one bit being indicative of a likelihood that the block is encoded in accordance with the angular prediction mode and including (i) a first flag indicating whether the angular prediction mode is applied for prediction of the block, and (ii) a second flag indicating whether a planar mode or a DC mode is applied for prediction of the block when the first flag indicates no angular mode is applied for the prediction of the block;

determine, before the set of bits corresponding to the angular prediction mode is fully decoded, a context for coding information of a secondary transform based on the first flag and the second flag of the at least one bit that is indicative of the likelihood that the block is encoded in accordance with the angular prediction mode; and decode the bits corresponding to the residues of the block using the coding information of the secondary transform that is decoded based on the context.

9. The apparatus of claim 8, wherein
the at least one bit being indicative of the likelihood that the block is encoded in accordance with the angular prediction mode includes at least one of a flag for most probable mode (MPM) and an index for MPM.

10. The apparatus of claim 8, wherein the determination of the context for coding information of the secondary transform further includes the processing circuitry being configured to:

determine the context for coding at least one of a flag for the secondary transform and an index for the secondary transform based on the at least one bit that is indicative of the likelihood that the block is encoded in accordance with the angular prediction mode.

11. The apparatus of claim 8, wherein
the at least one bit that is indicative of the likelihood that the block is encoded in accordance with the angular prediction mode includes an index for a most probable mode (MPM), and
wherein the determination of the context for coding the information for the secondary transform is based on at least one of a first bin and a second bin of the index for the MPM.

12. The apparatus of claim 10, wherein
the at least one bit that is indicative of the likelihood that the block is encoded in accordance with the angular prediction mode includes an index for a reference line of the block, and
wherein the determination of the context for coding the information for the secondary transform is based on at least one of a first bin and a second bin of the index for the reference line of the block.

13. The apparatus of claim 10, wherein
the at least one bit that is indicative of the likelihood that the block is encoded in accordance with the angular prediction mode includes an index for an intra sub partition of the block, and
wherein the determination of the context for coding the information for the secondary transform is based on at least one of a first bin and a second bin of the index for the intra sub-partition of the block.

14. The apparatus of claim 8, wherein the processing circuitry is further configured to:
disable the secondary transform when a size of the block is smaller than a threshold.

15. A non-transitory computer-readable medium storing instructions which when executed by a computer for video decoding cause the computer to perform:
receiving a bitstream including bits corresponding to residues of a block in a coded picture;

parsing the bitstream to extract at least one bit from a set of bits corresponding to an angular prediction mode, the at least one bit being indicative of a likelihood that the block is encoded in accordance with the angular prediction mode and including (i) a first flag indicating whether the angular prediction mode is applied for prediction of the block, and (ii) a second flag indicating whether a planar mode or a DC mode is applied for prediction of the block when the first flag indicates no angular mode is applied for the prediction of the block;

determining, before the set of bits corresponding to the angular prediction mode is fully decoded, a context for coding information of a secondary transform based on the first flag and the second flag of the at least one bit that is indicative of the likelihood that the block is encoded in accordance with the angular prediction mode; and decoding the bits corresponding to the residues of the block using the coding information of the secondary transform that is decoded based on the context.

16. The non-transitory computer-readable medium of claim 15, wherein the determining the context for coding information of the secondary transform further includes:

determining the context for coding at least one of a flag for the secondary transform and an index for the secondary transform based on the at least one bit that is indicative of the likelihood that the block is encoded in accordance with the angular prediction mode.

\* \* \* \* \*